United States Patent
Wier et al.

(10) Patent No.: US 10,579,955 B1
(45) Date of Patent: Mar. 3, 2020

(54) METHODS AND SYSTEMS FOR PROVIDING MULTI-CARRIER/MULTI-CHANNEL/MULTI-NATIONAL SHIPPING

(71) Applicant: Auctane, LLC, Austin, TX (US)

(72) Inventors: Byron J. Wier, Austin, TX (US); Jason Hodges, Austin, TX (US); Paul D. Henry, Austin, TX (US)

(73) Assignee: Auctane, LLC, Austin, TX (US)

( * ) Notice: Subject to any disclaimer, the term of this patent is extended or adjusted under 35 U.S.C. 154(b) by 489 days.

(21) Appl. No.: 14/788,542

(22) Filed: Jun. 30, 2015

(51) Int. Cl.
| | |
|---|---|
| *G06Q 30/00* | (2012.01) |
| *G06Q 10/08* | (2012.01) |
| *G06N 5/04* | (2006.01) |
| *G06N 7/00* | (2006.01) |

(52) U.S. Cl.
CPC .......... *G06Q 10/0838* (2013.01); *G06N 5/04* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 4,807,139 A | 2/1989 | Liechti | |
| 4,812,994 A * | 3/1989 | Taylor | G07B 17/0008 340/5.28 |
| 5,010,485 A | 4/1991 | Bigari | |
| 5,121,327 A * | 6/1992 | Salazar | G07B 17/00508 318/696 |
| 5,822,739 A | 10/1998 | Kara | |
| 6,381,590 B1 | 4/2002 | Debois | |
| 6,385,731 B2 | 5/2002 | Ananda | |
| 6,424,954 B1 | 7/2002 | Leon | |
| 6,889,214 B1 | 5/2005 | Pagel et al. | |
| 7,149,726 B1 | 12/2006 | Lingle et al. | |
| 7,177,825 B1 | 2/2007 | Borders et al. | |

(Continued)

FOREIGN PATENT DOCUMENTS

EP 1785856 A2 5/2007

OTHER PUBLICATIONS

"Endicia Releases Unique Return Shipping Solution," retrieved from http://www.endicia.com/about-us/press-room/20140610, last accessed May 13, 2015, Jun. 10, 2014, 2 pages.

(Continued)

*Primary Examiner* — Ariel J Yu
(74) *Attorney, Agent, or Firm* — Norton Rose Fulbright US LLP

(57) ABSTRACT

Systems and methods for performing various shipping related functionality are presented. The methods can automatically predict shipping attributes based on historical shipping data, and automatically purchase postage for a current shipment from a shared postage account while preventing the postage account shared among multiple users from having insufficient funds. Furthermore, predictions of shipping attributes for shipments may not be presented to a user, until the certainty of the predictions reaches or surpasses a confidence level or a threshold, where the confidence level or the threshold can be determined and changed by a user. Even when the certainty of the predictions reaches or surpasses a confidence level, and the predictions are presented to the user, the user can accept, reject, or change the predicted attributes.

30 Claims, 14 Drawing Sheets

(56) References Cited

U.S. PATENT DOCUMENTS

| | | |
|---|---|---|
| 7,233,929 B1 | 6/2007 | Lingle et al. |
| 7,243,842 B1 | 7/2007 | Leon et al. |
| 7,383,194 B2 | 6/2008 | Heiden et al. |
| 7,430,424 B2 | 9/2008 | Kraft et al. |
| 7,660,721 B2 | 2/2010 | Williams et al. |
| 7,756,796 B2 | 7/2010 | Bodie et al. |
| 7,765,168 B1* | 7/2010 | Dong .................. G06Q 50/32 |
| | | 705/401 |
| 7,827,118 B1 | 11/2010 | Smith, III et al. |
| 8,005,762 B2 | 8/2011 | Ogg et al. |
| 8,255,337 B1 | 8/2012 | Bennett et al. |
| 8,600,913 B2 | 12/2013 | Williams et al. |
| 8,868,472 B1* | 10/2014 | Lin ..................... G06N 99/005 |
| | | 706/12 |
| 9,082,234 B1 | 7/2015 | Clem |
| 9,230,233 B1* | 1/2016 | Sundaresan ........ G06Q 10/0832 |
| 9,761,061 B1 | 9/2017 | Bussell et al. |
| 9,842,308 B1* | 12/2017 | Biswas ............... G06Q 10/083 |
| 2003/0009425 A1 | 1/2003 | Stonedahl et al. |
| 2003/0050819 A1 | 3/2003 | Koenigbauer et al. |
| 2003/0088473 A1 | 5/2003 | Fisher et al. |
| 2004/0212833 A1 | 10/2004 | Taskett et al. |
| 2005/0060165 A1 | 3/2005 | Knight et al. |
| 2006/0173799 A1 | 8/2006 | Minnocci |
| 2006/0213979 A1 | 9/2006 | Geller et al. |
| 2006/0213980 A1 | 9/2006 | Geller et al. |
| 2006/0224462 A1 | 10/2006 | Brezenoff |
| 2006/0229895 A1 | 10/2006 | Kodger |
| 2007/0011187 A1* | 1/2007 | Chitgupakar ........... G06N 3/08 |
| 2007/0073551 A1 | 3/2007 | Williams et al. |
| 2007/0174213 A1 | 7/2007 | Whitehouse et al. |
| 2007/0198977 A1 | 8/2007 | Abernethy et al. |
| 2008/0103968 A1 | 5/2008 | Bies et al. |
| 2008/0133659 A1 | 6/2008 | Aldrey et al. |
| 2009/0146410 A1 | 6/2009 | Uslontsev et al. |
| 2009/0172084 A1 | 7/2009 | Lavanya et al. |
| 2009/0172126 A1 | 7/2009 | Brennan et al. |
| 2010/0076903 A1 | 3/2010 | Klingenberg et al. |
| 2010/0179892 A1 | 7/2010 | O'Brien et al. |
| 2010/0323722 A1 | 12/2010 | Hatami |
| 2011/0029429 A1 | 2/2011 | Whitehouse |
| 2011/0173144 A1* | 7/2011 | Shan .................... G06N 99/005 |
| | | 706/13 |
| 2011/0231334 A1 | 9/2011 | Jindel |
| 2011/0317158 A1* | 12/2011 | Lyng .................... G01N 21/65 |
| | | 356/301 |
| 2012/0054754 A1 | 3/2012 | Teichmann et al. |
| 2012/0109777 A1 | 5/2012 | Lipsitz et al. |
| 2012/0265676 A1 | 10/2012 | Gould et al. |
| 2013/0056533 A1 | 3/2013 | Zimberoff et al. |
| 2013/0061337 A1 | 3/2013 | Zimberoff et al. |
| 2013/0144763 A1* | 6/2013 | Skyberg ................ G06Q 50/28 |
| | | 705/27.1 |
| 2013/0179361 A1 | 7/2013 | Williams et al. |
| 2013/0346249 A1 | 12/2013 | Li |
| 2014/0149308 A1 | 5/2014 | Ming |
| 2014/0208325 A1 | 7/2014 | Chen et al. |
| 2015/0046361 A1* | 2/2015 | Williams ............. G06Q 10/083 |
| | | 705/330 |
| 2016/0196527 A1* | 7/2016 | Bose .................. G06Q 10/0832 |
| | | 705/332 |

OTHER PUBLICATIONS

"Return Shipping Labels—Simplify Product Returns Without the Extra Cost of Accounts & Permits," retrieved from http://www.endicia.com/Features/ReturnShippingLabels/, last accessed May 13, 2015, undated, 2 pages.

"Newgistics: Offering Reverse Logistics to Easily Manage Returns," retrieved from http://www.newgistics.com/corp_returns/#newgisticssmartlabelandshipmentmanager, last accessed May 13, 2015, undated, 5 pages.

"E-Commerce Technology—the Most Modular and Scalable E-Commerce Platform that Grows With Your Business," http://www.newgistics.com/corp_ecommerce/index.aspx, last accessed May 13, 2015, undated, 6 pages.

"Returns Made Easy," retrieved from <https://www.usps.com/returns/>, last accessed May 13, 2015, undated, 5 pages.

"Return Services & Options for Parcels," retrieved from https://www.usps.com/business/return-services.htm, last accessed May 13, 2015, undated, 6 pages.

Unpublished U.S. Appl. No. 13/647,001 to Yoggi, filed Oct. 8, 2012 and entitled "Systems and Methods for Providing Shipping Service Guarantees," 44 pages.

Unpublished U.S. Appl. No. 12/316,542 to Leon, filed Dec. 9, 2008 and entitled "Mail Piece Processing," 74 pages.

Unpublished U.S. Appl. No. 13/705,935 to McBride, filed Dec. 5, 2012 and entitled "Visual Graphic Tracking of Item Shipment and Delivery," 62 pages.

Unpublished U.S. Appl. No. 13/828,800 to Atkinson, filed Mar. 14, 2013 and entitled "Systems and Methods for Mail Piece Interception, Rescue Tracking, and Confiscation Alerts and Related Services," 63 pages.

International Search Report and Written Opinion issued for PCT Application No. PCT/US2017/020662, dated May 19, 2017, 14 pages.

* cited by examiner

METHODS AND SYSTEMS FOR PROVIDING MULTI-CARRIER/MULTI-CHANNEL/MULTI-NATIONAL SHIPPING

CROSS-REFERENCE TO RELATED APPLICATIONS

The present application is related to and commonly assigned U.S. provisional application Ser. No. 62/082,393 entitled "SYSTEMS AND METHODS FOR CLOUD-BASED APPLICATION ACCESS TO RESOURCES," filed Nov. 20, 2014, the disclosure of which is hereby incorporated herein by reference.

TECHNICAL FIELD

The present invention generally relates to shipping related functionality and, more particularly, to providing multi-carrier/multi-channel/multi-national shipping management operations, integration, and services.

BACKGROUND OF THE INVENTION

The use of various forms of computing equipment to automate or otherwise perform a number of tasks has become widespread. With the proliferation of processor-based platforms, such as personal computers (PCs), tablet devices, smart phones, personal digital assistants (PDAs), and servers, capable of executing instruction sets for providing specialized or generalized functionality, such as word processing, accounting, document generation and management, printing, data communication, and image capture, generation, and management, the use of such computing equipment has become nearly ubiquitous in both business as well as personal settings. Various forms of computing equipment can be further connected by networks, e.g., Internet or local area network (LAN), to perform even more complex functions, such as automating tasks involving electronic-commerce (e-commerce) transactions, to perform automated tasks via a network in the cloud, or others.

In today's world of ecommerce and widespread marketing via the Internet, an ever increasing amount of goods are ordered or purchased by buyers from ecommerce market places or other ecommerce outlets (e.g., Amazon.com, Inc., Best Buy Co., Inc., Overstock.com, Inc., etc.), as well as smaller enterprises and individuals (e.g., small businesses, sole proprietorships, and even individuals who market goods via their own web sites or through communal marketing web sites, such as eBay.com, Amazon's Marketplace, etc.). Orders for goods purchased through such ecommerce outlets are typically shipped from the seller or other providers to buyers using one or more shipping service providers (e.g., United States Postal Service (USPS), United Parcel Service (UPS), Federal Express (FedEx), etc.).

Various forms of computing equipment and related systems can be used to automate tasks associated with the shipment of ordered items, including: (1) the management of orders, (2) managing the picking and packing of items for order fulfillment, (3) generation of invoices, packing slips, manifests, shipping labels, and postage or other prepaid shipping indicia, and (4) tracking of shipment of items through a shipping service provider. Various forms of computing equipment and related systems can also be used to allow sellers and/or shippers, either individuals and/or businesses (collectively users), to generate and print postage indicia using personal computers and similar processor-based systems, to satisfy the postage needs for the shipment of an order. For example, the Stamps.com Inc. postage system allows for generating postage indicia data and printing of postage indicia using personal computers, and the SHIPSTATION web based shipping management system, provided by Auctane LLC (a wholly owned subsidiary of Stamps.com Inc.) provides automation of tasks associated with the shipment of ordered items.

Items can be shipped using various shipping service program options. For example, a user can select a shipping service program such as USPS Priority Mail, USPS Express Mail, USPS Parcel Select, UPS Brown Label, UPS Red Label, UPS Blue Label, etc. for use in shipping an item in connection with an order. Also, a user can designate pick up of an item from a warehouse or store in connection with an order. Alternatively, a shipping service program can be designated using more general shipping quality of service (QoS) levels (e.g., standard, expedited, 3-5 day, 2 day, overnight, etc.) which do not denote a particular shipping service provider to be used. The shipping service program options can be specified by the buyer, or may be determined by a seller and/or a market place where the order was made.

A seller (whether the aforementioned large enterprise or a smaller enterprise), shipper, or an agent of the seller tasked with shipping the ordered items often selects appropriate shipping media or package types (e.g., envelopes, padded envelopes, flats, boxes, etc.), that will (1) properly contain ordered items to be shipped, and (2) meet requirements/limitations of the selected shipping service program. Such selections may be further complicated by the need to select a shipping QoS level. A further challenge is that some shipping service providers utilize fixed rate media (e.g., particular sizes/configurations of envelopes, flats, and/or boxes for which shipping rates are fixed for the media regardless of the weight of the item and/or distance between a shipment origination location and a shipment delivery destination) with respect to certain shipping service programs, whereby the seller or the agent may further be tasked with selection of shipping service program options as well as selection of appropriate fixed rate media for shipping the ordered items.

In addition to the aforementioned complexities arising from selection of various shipping media and shipping service programs (or shipping QoS levels), many sellers or shippers are confronted with additional complexities associated with the availability of a plurality of warehouses from which any particular order may be shipped. For example, a large enterprise may have regional warehouses or other fulfillment sites distributed geographically throughout a country or even the world from which ordered items may be shipped. Thus, in addition to selecting the appropriate shipping service program and shipping media, some sellers must further select an appropriate location from which the shipment of the ordered items will originate (e.g., enter the mail stream).

Due to the large number of options available with respect to shipping any particular item of an order, such as may result from the combination of a number of shipping media being suitable for containing the item, as well as a number of shipping service programs being suitable for transporting the item within any designated QoS levels, sellers and/or their agents may spend a lot of time determining the details of shipping the order.

BRIEF SUMMARY OF THE INVENTION

The present embodiments of invention are directed to systems and methods for performing various shipping related functionality, such as embodiments that automatically predict shipping attributes including shipping service providers, shipping service programs, packaging type, postage account balance, and automatically purchase postage for a current shipment from a shared postage account to reduce interruptions and achieve more parallelism. Furthermore, methods and systems of embodiments can combine user intervention with automatic prediction of attributes where user interventions can correct any prediction errors and/or accommodate user control.

With a large number of orders generated every moment in the current ecommerce world and a large number of options available in fulfilling the shipping of orders, the use of a shipping management system may be desirable to provide management of the shipments of orders. For a shipping management system, the manual entry of shipping attributes for orders can be tedious, time consuming, and error prone. Automatic prediction of shipping attributes for the shipment of orders according to embodiments of the invention can save time and may reduce errors that may otherwise be caused or introduced by manual entry.

Embodiments of methods and systems are presented that can automatically predict shipping attributes such as shipping service providers, shipping service programs, packaging type or shipping media, postage account balance, among others. Such predictions may, for example, be based on historical data and details of the order such as item type included in the order, weight, shipping origin zone, etc. Additionally or alternatively, other shipping attributes such as insurance, return label, etc. In an embodiment, such predictions may be based, at least in part, on historical data. Moreover, embodiments may generate different predictions for the same user based on the time and seasonality of the shipment.

Furthermore, automatic shipping management methods and systems of embodiments may provide automatic postage account balance prediction and postage purchasing for shipping orders. Embodiments can automatically predict postage account balances and then fund a postage account before the postage account become insufficient, which would otherwise cause interruptions to shipment preparations. When multiple users share the same postage account, conflicts may occur when multiple users access the shared postage account at the same time, where the account balance cannot accurately reflect the funds available. An accurate postage account balance prediction of a shared postage account and purchasing postage before the funds become insufficient can allow more parallel operations among multiple users preparing a shipment sharing. Rather than locking the shared postage account during the entire process of preparing the shipment, and generating postage indicia with the right postage amount for a shipment by a user, embodiments herein lock a shared postage account while checking the account balance before preparing the shipment and generating postage indicia, and then unlock the shared postage account while the shipment is prepared and postage indicia is generated. Further, the shared postage account is then locked once again to purchase the postage indicia generated for the shipment.

A completely automatic prediction system can produce prediction errors which are not acceptable for a practical shipping management system since any uncorrected prediction errors in the actual shipment can cause financial damages and losses for the seller, while making buyers unhappy as well. In addition, a user may want to make changes to the predicted attributes in some situations, even if the predicted attributes are correct. Shipment management systems of embodiments are enhanced by allowing user intervention with respect to the predicted attributes. Compared to a purely manual entry of attributes for shipments of ordered items, a combination of automatic prediction and user intervention with respect to the attributes can save time, since many of the attributes will often be predicted correctly by an automatic prediction system configured in accordance with embodiments of the invention. Compared to a completely automatic prediction approach, a combination of automatic attribute prediction and user intervention can correct any errors or to make changes to the predicted attributes for other purposes, therefore making automatic predictions more useful and robust.

In embodiments, user intervention with respect to automatic predictions of shipping attributes can occur at various times. For example, a user can enable or disable prediction of shipping attributes. Additionally, when shipping attribute predictions are enables, the user may be able to control when predicted shipping attributes are presented for consideration by the user by setting a confidence level or threshold. That is to say, the user may configure presentation of predicted shipping attributes such that a predicted attribute is presented to the user (e.g., for purposes of allowing the user to accept or reject the predicted attribute) when a certainty for the predicted attribute reaches or surpasses the user specified confidence level. Embodiments may further analyze historical data associated with past shipments of orders to determine whether a predicted attribute satisfies the confidence level or threshold. The historical data may form a dynamic training data set, whereby all orders shipped by the user are added to the historical data set and are analyzed in connection with predictions of attributes for shipments of future order. In an embodiment, the confidence level can be individually set for each user. In an additional or alternative embodiment, confidence levels may be created for or applied to a group of users. Therefore, the prediction system can be controlled at a very fine level of granularity (e.g., using confidence levels specific to a particular user, a particular shipment type, a particular buyer, etc.), or may be controlled at a higher level of granularity (e.g., using confidence levels specific to a group or class of users, shipment types, buyers, etc.). Moreover, in accordance with embodiments, a user can change the confidence level depending on the situation or define different confidence levels for different situations (e.g., use a first confidence level for shipments during the months of January through November, and use a second confidence level for shipments during the month of December), making the prediction system more robust and dynamic.

According to embodiments, even when the certainty of a predicted attribute satisfies the confidence level, the user can still accept, reject, or change the predicted attribute, to correct any errors or make any desired changes. In an embodiment, the user may reject or change the predicted attributes even when the predicted attributes were predicted correctly (e.g., satisfy the QoS level for the shipment, etc.). A completely automatic prediction system would not be able to accommodate such changes by the user.

In addition, according to embodiments, a user can further intervene in the automatic prediction system by manually providing prediction rules that are used to predict attributes, and selecting one or more learning algorithms to be used to construct different rules that are used to predict attributes. Additionally or alternatively, the prediction system may be configured to analyze attribute prediction errors and dynamically adjusting the rules/algorithms based on the identified prediction errors.

In summary, in accordance with embodiments, predictions of attributes for shipment of an order, such as shipping service providers, shipping service program, packaging type, postage account balance, and/or other attributes can be performed using rules constructed based on historical data and/or order information. According to embodiments, predictions of attributes for shipments may not be presented to a user until the certainty of the predictions satisfies a confidence level or a threshold, which may be determined and/or changed by the user. According to embodiments, prediction rules can be constructed online or offline, based on the user's previous shipping behavior or the shipping behavior of other users. Furthermore, when the predictions are presented to the user, the user may be provided with controls to allow the user to accept, reject, or change the predicted attributes. According to some embodiments, the prediction rules can be dynamically updated when a certainty of the predicted attribute is not higher than the threshold, or when the predicted attribute is changed by a user. Multiple prediction algorithms can be used to generate multiple prediction rules which may be used to generate multiple predictions for an attribute. This may enable embodiments to identify a prediction algorithm that produces more accurate prediction results than another prediction algorithm in a given situation.

Even though embodiments are provided and described herein with respect to data related to attributes for the shipment of orders, the concepts disclosed herein can be generally applied to other kinds of data such as gene expression data, patient medical records, financial transactions, census data, demographic data, etc., where automatic prediction can be combined with user intervention to ensure more accurate predictions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1A:
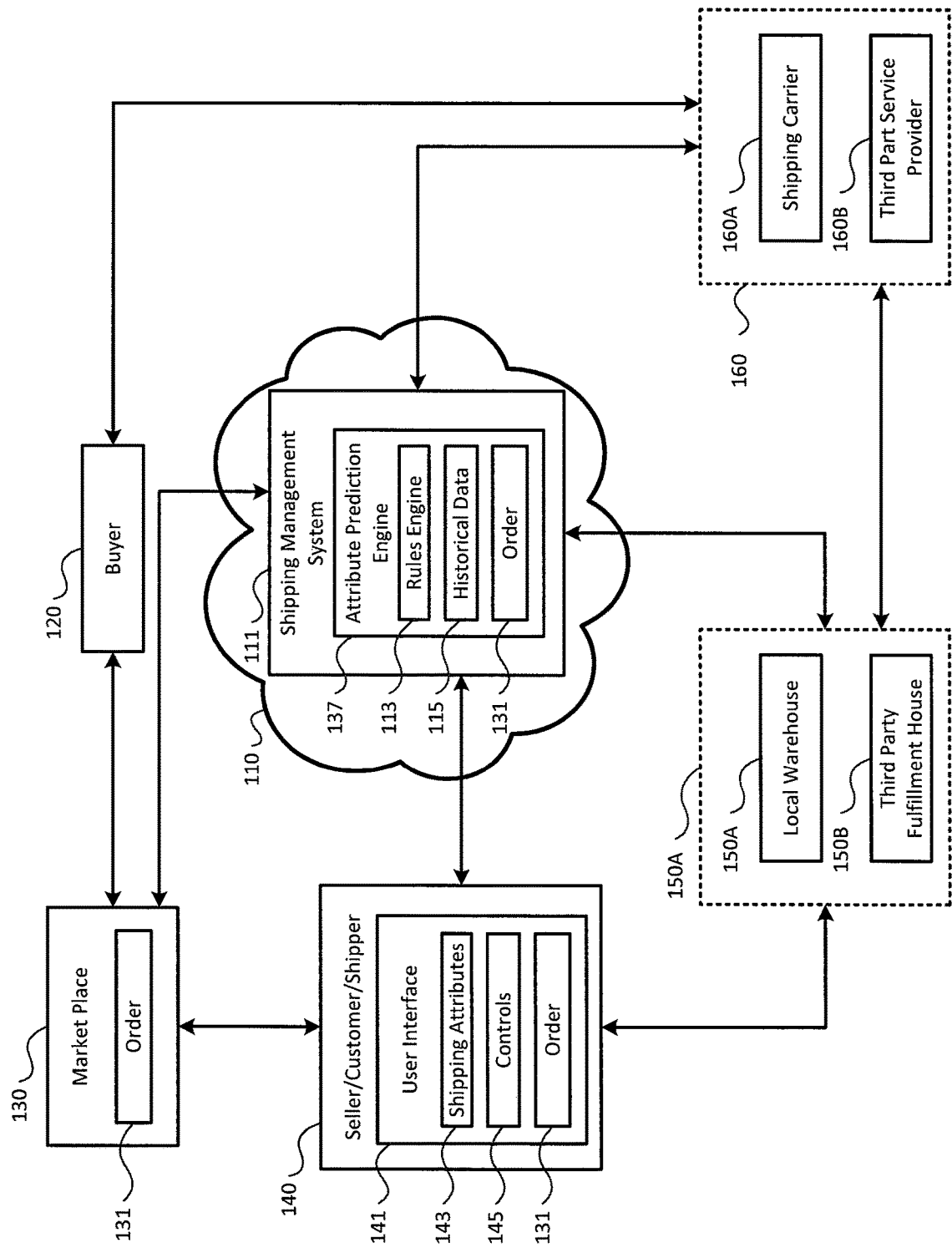
FIG. 1A is an illustrative embodiment of a system including various components to facilitate placement and shipment of orders using shipping attribute prediction and user intervention techniques.
Figure 1B:
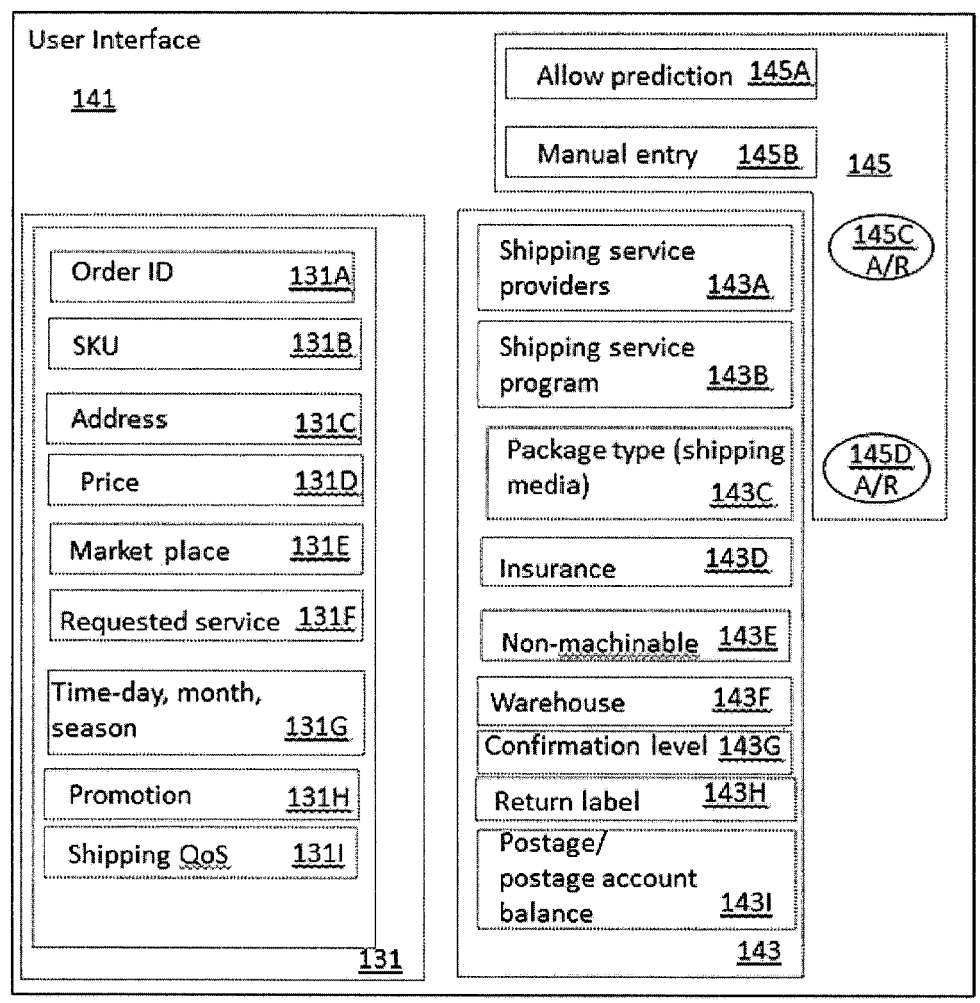
FIG. 1B is a block diagram illustrating embodiment of a user interface for displaying attribute and control information in connection with an order.
Figure 1C:
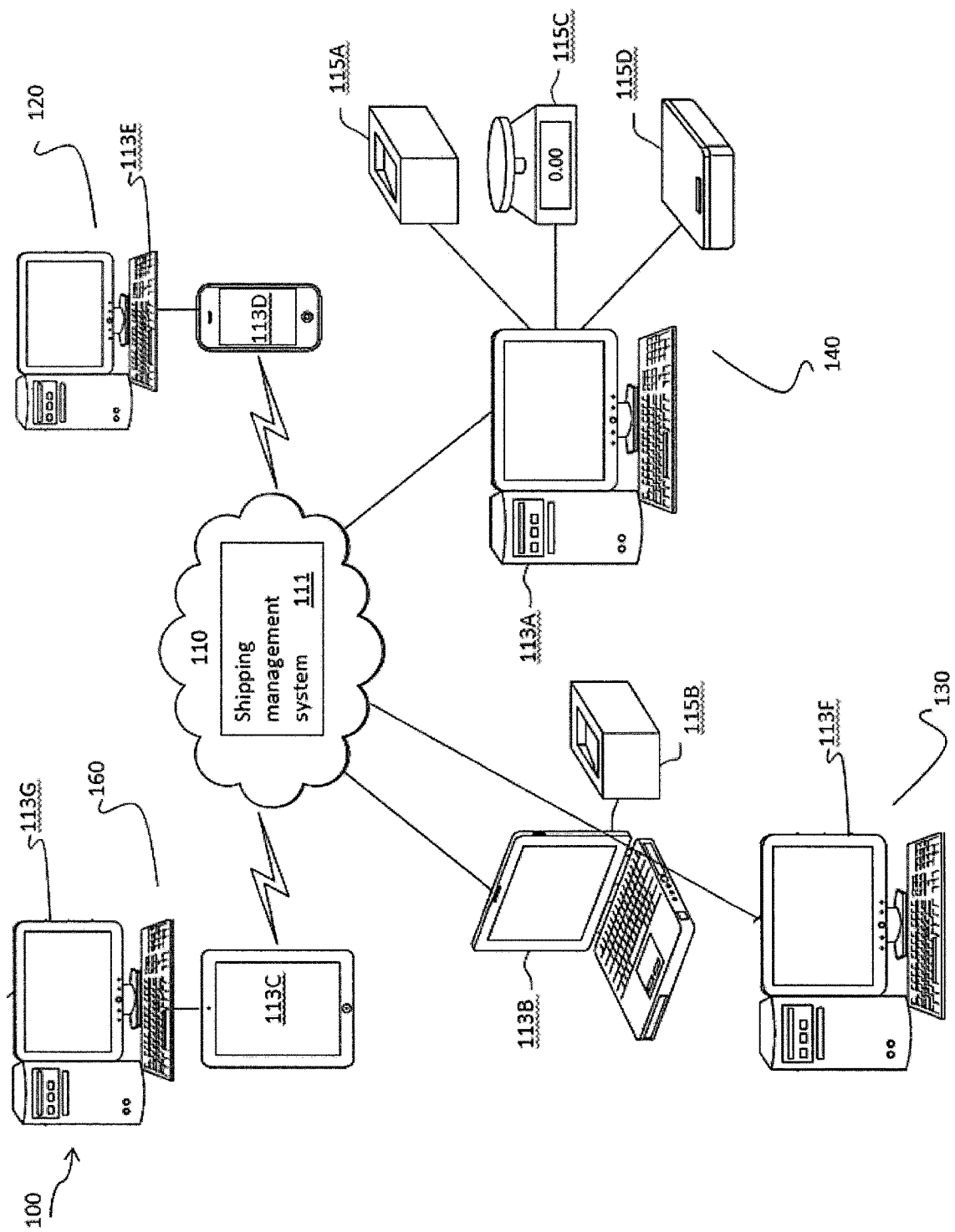
FIG. 1C illustrates exemplary embodiments of components and devices that may be utilized by systems in connection with the offering of items for sale, the ordering items, and the management of shipment of ordered items.

FIGS. 1A-1C illustrate various aspects for utilizing a shipping management system that includes an attribute prediction engine for predicting shipping attributes for shipment of an order according to embodiments of the invention. Automatic prediction of those attributes by attribute prediction engine 137 can be useful. For example, it may be time consuming to manually enter values of shipping attributes due to the large number of possible shipping attributes. Additionally, as the number of shipping attributes needed for a particular shipment increases, so too does the complexity of configuring/entering the shipping attributes. Due to these complexities and other factors, manual entry of the shipping attributes is often an error prone task. The disclosed embodiments for shipping management systems include an attribute prediction engine 137 configured to automatically predict shipping attributes 143, such as shipping service providers, third party service providers, online postage service providers, shipping service programs, packaging type or shipping media, postage account balance, and the like. In an embodiment, such predictions may be made by a rule engine 113 based on rules, based on historical data 115, and/or based on details of an order 131, such as an item type, a weight, a shipping origin zone, a destination, etc. Embodiments for shipping management systems may further also include controls 145 to facilitate user intervention with respect to the predicted attributes, such as to correct any errors in predicted attributes or to make changes to the predicted attributes due to changing situations. Additionally, the controls 145 may further facilitate user intervention with respect to the predicted attributes even when the predicted attributes are correct.

In FIG. 1A, an illustrative embodiment of a system including various components to facilitate placement and shipment of orders using shipping attribute prediction and user intervention techniques is shown as a system 100. As shown in FIG. 1A, the system 100 may include a network 110, a shipping management system 111, a buyer system 120, a market place system 130, a seller/customer/shipper system 140, warehouse systems 150, and service provider/carrier systems 160. In an embodiment, the warehouse systems 150 may include a local warehouse system 150A, and a third party fulfillment house system 150B. The local warehouse system 150A may be operated by an operator of the seller/customer/shipper system 140. For example, the operator of the seller/customer/shipper system 140 may offer items for sale via the market place system 130, and may operate a warehouse where such items are stored until a buyer (e.g., a user of the buyer system 120) orders one or more of the items from the market place system 130. Once an order for an item(s) has been placed, the item may be retrieved from the warehouse and shipped to the buyer. The local warehouse system 150A may be used to manage inventory of items stored at the warehouse, and other functions, as described elsewhere herein. The third party fulfillment house system 150B may correspond to a warehouse management system used to manage, among other things, operations of a warehouse operated by a third party (e.g., a party other than the operator of the seller/customer/shipper system 140). For example, the operator of the seller/customer/shipper system 140 may utilize a third party entity to warehouse items offered for sale via the market place system 130, and the third party entity may then facilitate shipment of the items to buyers on behalf of the operator of the seller/customer/shipper system 140. It is noted that in other embodiments, the warehouse systems 150 may be omitted. In still other embodiments, the local warehouse system 150A or the third party fulfillment house system 150B may be omitted. Further, it is noted that while only a single local warehouse system 150A and a single third party fulfillment house system 150B are shown, the system 100 may include a plurality of local warehouse systems 150A and/or a plurality of third party fulfillment houses 150B.

In an embodiment, the service provider/carrier systems 160 may include a third party service provider system 160A and a shipping carrier system 160B. The online postage service system 160A may be operated by an entity that provides products and services to entities in connection with the shipment of items, but that does not actually provide for transport of the shipped items. As an example, the third party service provider system 160A may be operated by an entity such as Stamps.com Inc., which sells postage and shipping supplies (e.g., labels, stamp media, envelopes, flats, boxes, crates, packing materials, etc.), but is not involved in the actual transport/delivery of shipped items. Other examples of entities that may operate third party service provider systems may include pack and ship service providers, shipping insurance service providers, other postage service providers, etc. The shipping carrier system 160B may be operated by an entity that facilitates the transport of shipped items from a point of origin to a destination. For example, the shipping carrier system 160B may be associated with an entity such as the United States Postal Service (USPS), FedEx, UPS, DHL, and the like. It is noted that in other embodiments, the service provider/carrier systems 160 may include a plurality of third party service provider systems 160A and/or a plurality of shipping carrier systems 160B. In still other embodiments, the third party service provider system 160A may be omitted.

In an embodiment, the shipping management system 111 comprises a cloud-based deployment of an application which is stored and executed by computing equipment disposed in the "cloud" of network 110. Accordingly, the shipping management system 111 may comprise computer executable code executing on one or more processor-based systems (e.g., web servers) deployed in network 110. The shipping management system 111 may, for example, comprise a system providing various desired functionality such as in the form of software as a service (SaaS), infrastructure as a service (IaaS), platform as a service (PaaS), unified communications as a service (UCaaS), etc. As a specific example, the shipping management system 111 may be configured to predict one or more shipping attributes in connection with shipment of an order, and to provide user intervention functionality that enables a seller to override or accept the predicted shipping attributes. As another example, the shipping management system 111 may provide an interface (e.g., a hardware interface, an application programming interface (API) or another form of software interface, or a combination of hardware and API/software interfaces) to exchange information (e.g., order information, inventory information, shipping label information, tracking information, notification information, etc.) between the shipping management system 111 and other systems (e.g., the market place system 130, the seller/customer/shipper system 140, the warehouse systems 150, and the service provider/carrier systems 160).

In accordance with embodiments of the invention, shipping management system 111 provides a multi-carrier shipping management system capable of providing access to various functionality (e.g., rating, shipping indicia generation, packing list printing, shipping label printing, tracking, carrier pickup request, manifest printing, account management and payment, etc.) provided by the service provider/carrier systems 160, and provides a multi-channel shipping management system capable of providing various order functionality (e.g., order information retrieval and information updates) for a plurality of market places (e.g., Amazon.com®, eBay.com®, Shopify, Etsy.com, Overstock.com, seller operated web pages, etc.). Thus, the shipping management system 111 of embodiments may be a multi-carrier/multi-channel shipping management system.

As shown in FIG. 1A, the shipping management system 111 may be hosted in the network 110, and may communicate with the market place system 130, the seller/customer/shipper system 140, the warehouse systems 150, the service provider/carrier systems 160, the via the network 110. It is noted however, that the communication between the various systems and the network 110 may be facilitated in part via connections to networks other than the network 110 (e.g., a connection to the internet, etc.).

The seller/customer/shipper system 140 may be configured to, amongst other things, provide a user interface 141 that may be used to display information (item attributes, shipping attributes 143, and control 145) associated with an order 131 (e.g., an order placed by a user of the buyer system 120 via the market place system 130). For example, and referring briefly to FIG. 1B, a block diagram illustrating embodiment of a user interface for displaying attribute and control information in connection with an order is shown. In FIG. 1B, the user interface 141 of FIG. 1A is shown in more detail, and is configured to present information associated with the order 131. The information presented by the user interface 141 may include item attributes 131, shipping attributes 143, and controls 145. In an embodiment, at least a portion of the shipping attributes 143 can be predicted by the attribute prediction engine 137 of the shipping management system 111. Additional aspects of the user interface 141 provided by the seller/customer/shipper system 140 are described in more detail below.

Buyer system 120 of embodiments may provide a system by which a buyer of goods may interact with the market place system 130 to place orders for one or more items offered for sale at the market place system 130 by a seller (e.g., an operator of the seller/customer/shipper system 140). For example, the buyer may use the buyer system 120 of embodiments to: 1) access the market place system 130; 2) identify items offered for sale via the market place system 130 by the seller; and 3) place an order (e.g., the order 131) for an item or a collection of items. The buyer system 120 of embodiments may comprise any number of system configurations that may be used by the buyer for selecting, purchasing, or otherwise requesting one or more items to be shipped to the buyer or the buyer's designee. It should be appreciated that although one buyer system 120 is shown in FIG. 1A, any number and combination of configurations of buyer systems may be accommodated by the system 100 in accordance with embodiments.

During operations according to embodiments of the present invention, the order 131 can be placed by the buyer using the buyer system 120, and information associated with the order 131 may be stored at a database of the market place system 130. In an embodiment, the shipping management system 111 may be configured to periodically retrieve order information from the market place system 130 (and other market place systems not shown in FIG. 1A), and to store the order information at a database provided by or accessible to the shipping management system 111. Once the order 131 is placed, the seller (or the seller/customer/shipper system 140) may be notified of the order 131, and the shipper may initiate shipment of one or more items of the order 131. In an embodiment, shipment of the order 131 may be performed by the seller, such as when the seller is a small business (e.g., a sole proprietorship, etc.) that does not operate a local warehouse (e.g., the local warehouse system 150A) and that does not utilize a third party fulfillment house (e.g., the third party fulfillment house 150B) to store and ship items in connection with orders, such as the order 131. In an additional or alternative embodiment, initiating shipment of the order may include providing information (e.g., shipping attribute information, order information, shipping instructions, or a combination thereof) to one of the warehouse systems 150, where personnel of the warehouse then ship the item(s) of the order 131 to the buyer or the buyer's designee in accordance with the information received from the seller. It is noted that although embodiments are described herein in connection with a single order (e.g., the order 131), the buyer system 120 (and other buyer systems not shown in FIG. 1A) can make multiple orders, which may be received or made within a brief period of time, or at different times.

It is noted that embodiments of the present disclosure provide techniques for configuring shipment of ordered items regardless of the number and frequency of orders made by buyers using buyer systems, such as the buyer system 120.

The order 131 of embodiments may have many attributes, which may be presented to the seller via the user interface 141 in connection with arranging shipment of the order 131. For example, and referring back to FIG. 1B, the user interface 141 may present information associated with order attributes 131A-131I, information associated with shipping attributes 143, and controls 145. It is noted that the exemplary information illustrated as being presented at the user interface 141 is provided for purposes of illustration, rather than by way of limitation, and other combinations of features/information not shown in FIG. 1B can be displayed at the user interface 141 in connection with arranging shipment of the order 131 in some embodiments. Further, it is noted that although user interface 141 is shown as one screen, the user interface 141 can be implemented in multiple screens, multiple tabs, etc. with similar information in some embodiments.

As illustrated in FIG. 1B, order 131 can include a plurality of order attributes 131A-131I, which may include an order ID 131A, a stock keeping units (SKU) 131B, an address 131C, a price 131D, a market place 131E, a requested service 131F, a time 131G, a promotion 131H, or a shipping QoS 131I, etc. The order attributes 131A-131I illustrated in FIG. 1B are provided for purposes of illustration rather than by way of limitation, and embodiments of the present invention may operate using less than the illustrated order attributes or using additional order attributes not shown in FIG. 1B.

In an embodiment, the order ID 131A may be generated by a market place (e.g., the market place system 130) when the order 131 is placed by the buyer, and may be used to identify the order 131. Additionally, the order 131 may be identified by other related information such as buyer information, item information, etc. The SKU 131B can specify a stock keeping unit (SKU) of the item(s) to be delivered in connection with the order 131. In an embodiment, the SKU 131B may be used to identify additional data associated with the item(s) to be delivered in connection with the order 131. For example, the SKU 131B may be used to determine a weight of the item(s) (e.g., a weight the item(s) alone, a weight of the item(s) including any manufacturer's packaging, a weight of the item(s) including any manufacturer's packaging and packing material for shipment, and/or the like), a size (e.g., length, width, depth, girth, volume, and/or the like) of item(s), and/or other information that may be useful in determining shipping parameters in connection with the shipment of the item(s) associated with the order 131. The individual SKU information may additionally or alternatively be used to identify shipping configuration data, such as a shipping class, information indicating compatibility of the item(s) of the order 131 with various types of shipping media, special handling instructions associated with the item(s) of the order 131, restrictions/limitations associated with shipment of the item(s) of the order 131, etc.

Address 131C can be provided by a buyer to indicate where the ordered item(s) are to be shipped. Price 131D can indicate an overall price of the ordered item(s). Market place 131E can indicate where the order 131 is from (e.g., identify the market place system 130 where the order 131 originated). Requested service 131F can indicate what kind of shipping service the buyer requested when placing the order 131. Time 131G can indicate when the order 131 was placed.

In an embodiment, time 131G may indicate a day, a month, or a season. Promotion 131H can indicate whether or not the order 131 was placed in connection with a promotion offered by the seller, which can impact how fast the item(s) of the order 131 may be delivered.

The order attributes of embodiments may further include shipping QoS 131I, which may be used to determine a quality of service (QoS) for the order 131 (e.g., how fast the item(s) of the order 131 are requested to arrive to the address indicated by the address 131C). For example, at the time the order 131 is placed via the market place system 130, the buyer may be offered a list of shipping services available with respect to the ordered item(s) from which the buyer may designate a particular shipping service for use with respect to the order. Alternatively, the buyer may be offered a list of a general shipping QoS levels, such as standard, expedited, best available, 3-5 day, 2 day, overnight, etc., from which the buyer may designate a particular shipping QoS level for use with respect to the order.

Although not directly a part of the operation of the inventive concepts herein, it should be appreciated that an electronic commerce transaction or similar commercial transaction may be performed in association with the receipt of the aforementioned order 131. For example, the buyer using buyer system 120 may provide payment information, such as through the use of a credit card, debit card, online payment service (e.g., PayPal), etc., to pay for the order 131. Such payment may additionally include payment for the selected shipping service or shipping QoS level.

According to embodiments of the present invention, in addition to an order, such as the order 131, being associated with or including order attributes 131A-131I, the order 131 may be associated with or include the shipping attributes 143. As illustrated in FIG. 1B, the shipping attributes 143 can include a plurality of attributes, such as shipping service providers attribute 143A, shipping service program 143B, package type attribute 143C, insurance 143D, non-machinable 143E, warehouse 143F, confirmation level 143G, return label 143H, and postage account 143I, etc. It is noted that the shipping attributes 143 illustrated in FIG. 1B are provided for purposes of illustration, rather than by way of limitation, and that embodiments of the present invention may operate using more or less shipping attributes than are illustrated in FIG. 1B.

Shipping service providers attribute 143A may identify national and international carriers such as USPS, UPS, Federal Express, DHL, J. B. Hunt, etc. and/or regional and local carriers such as California Overnight, OnTrac, Lone Star Overnight, etc. that are to provide transport of the item(s) of the order 131 through a mail stream from a point of origin (e.g., a location where the shipment of the order 131 originates or is placed into the mail stream) to a destination (e.g., the address indicated by the address 131C). The shipping service programs 143B may be used to identify one of a plurality of shipping service programs offered by the shipping carrier indicated by the shipping service providers attribute 143A to fulfill the shipment of an order. Exemplary shipping service programs that may be identified using the shipping services programs 143B may include First Class, USPS Priority Mail, USPS Express Mail, USPS Media Rate, USPS Parcel Select, UPS Brown Label, UPS Red Label, UPS Blue Label, Federal Express Ground, Federal Express 2 Day, Federal Express Overnight, in warehouse or store pickup, etc.

Package type attribute 143C can include selections of various sizes of envelopes, padded envelopes, flats, boxes, etc., which will both properly contain the item(s) to be shipped in connection with the order 131, and meet requirements/limitations of the shipping service program indicated by the shipping service program 143B. The selections of shipping media may be complicated by the need to select a particular shipping service meeting the buyer's selected shipping QoS level, as indicated by the shipping QoS 131I, while also selecting shipping media to properly contain the item(s) to be shipped and meeting the requirements/limitations of the selected shipping service program. As a still further challenge, some shipping service providers utilize fixed rate media (e.g., particular sizes/configurations of envelopes, flats, and/or boxes for which shipping rates are fixed for the media regardless of the weight of the item and/or distance between shipment and delivery) with respect to certain shipping service programs, whereby the seller or seller's agent (e.g., an operator of the local warehouse system 150A or the third party fulfillment house system 150B) may be tasked with selection as between these shipping service options as well as selection of appropriate shipping media from the fixed rate media.

Insurance 143D can specify whether any insurance is wanted for the shipment of the order 131, and what kind of insurance may be wanted for the shipment of the order. Non-machinable 143E can specify whether an item can go through a roller or other mechanical process during the shipping process. A non-machinable item would not be able to go through a roller machine in the shipping process because the roller machine may crush or otherwise damage the item. Warehouse 143F can specify which warehouse the shipment will originate from if the seller/shipper has multiple warehouses. For example, warehouse 143F may indicate that shipment of the order 131 may originate from the local warehouse associated with the local warehouse system 150A, or from the third party fulfillment house associated with the third party fulfillment house system 150B. Confirmation level 143G can specify whether any format of confirmation of the delivery is needed, such as signature of the receiver, an online confirmation, and so on. Return label 143H can specify whether a return label should be included in the shipment of the order 131. Postage account 143I can specify how much postage may be purchased for the shipment of the order 131. In an embodiment, postage account 143I may include a prediction of a postage account balance (e.g., a postage account balance associated with a third party shipping service provider, such as Stamps.com), or other information related to postage.

According to embodiments of the present invention, user interface 141 can further include various controls 145, such as controls 145A, 145B, 145C, and 145D that facilitate user intervention to accept or reject shipping attributes 143 that have been predicted by the shipping management system 111. The use of controls 145 can make the automatic prediction system more accurate and dynamic, and may facilitate adjustments to account for future needs, which may make the system 100 more useful and may introduce efficiencies into the process or shipping orders using the system 100 and the shipping management system 111.

Control fields 145A and 145B can be used to select whether certain prediction or manual entry is allowed for attributes. For example, seller/customer/shipper system 140 can select allow prediction 145A to allow prediction for shipping attributes, or select manual entry 145B to allow manual entry of attributes of an order, which can disable predictions by shipping management system 111. Control field 145A or 145B can be selected for a particular seller system such as seller/customer/shipper system 140. In an embodiment, selection of one of the control fields 145A or 145B may be applied to all orders related to seller/customer/shipper system 140. In an additional or alternative embodiment, selection of one of the control fields 145A or 145B may be applied to a single order, such as order 131. In an embodiment, settings may be used to toggle whether selection of one of the control fields 145A/145B is to be applied to all orders, or a single order In an additional or alternative embodiment, the settings may be used to configured the selection of the controls 145A/145B to operate on a single order or all orders for a given time period (e.g., a season, a week, a day, a month, etc.), and can be changed at any time as desired. In an embodiment, the settings may be configured via the user interface 141 and may be communicated to the shipping management system 111 (e.g., using a function call to the interface provided by the shipping management system 111).

Controls 145C and 145D may allow a shipper to accept or reject a predicted attribute when the predicted attribute is presented at the user interface 141. For example, the buyer may designate a general shipping QoS level, such as standard, expedited, best available, 3-5 day, 2 day, overnight, etc. Accordingly, there may be a number of shipping services (e.g., candidate shipping services) available to the provider or the provider's designee (e.g., third party fulfillment provider) from one or more shipping service providers (e.g., national and international carriers such as USPS, UPS, Federal Express, DHL, J. B. Hunt, etc. and/or regional and local carriers such as California Overnight, OnTrac, etc.) which meet the buyer's designated shipping QoS level. Moreover, there may be a number of shipping media (e.g., candidate shipping media), such as different sizes and/or configurations of envelopes, padded envelopes, flats, boxes, etc., which will both contain the requested goods as well as being compatible with one or more candidate shipping services). Shipping management system 111 may predict use of DHL and a padded envelope for the shipment of the order 131, and may configure the shipping service providers attribute 143A to indicate DHL, and may configure the package type attribute 143C to indicate that a padded envelope is recommended for shipment of the order 131. The user can click control 145C and/or 145D to accept or reject the predicted shipping attributes. It is noted that although only two such accept/reject controls 145C and 145D are shown, similar controls may be provided for any of the shipping attributes 143 so that the shipper can choose to accept or reject a predicted attribute. Additional aspects of predicting shipping attributes using the shipping management system 111 are described below.

Referring back to FIG. 1A, during operations, after the order 131 is placed, the shipping management system 111 may retrieve the order 131 from the market place system 130, and may store information associated with the order at a database of the shipping management system 111. In an embodiment, the information associated with the order may include all or a portion of the order attributes 131A-131I. In an embodiment, the seller/customer/shipper system 140 may utilize the interface provided by the shipping management system 111 (e.g., the hardware interface, API/software interface, or a hardware/API/software interface) to import the order 131 into the seller/customer/shipper system 140.

After learning of the order 131, whether by importing the order 131 into the seller/customer/shipper system 140 or through accessing the order 131 via interaction with the shipping management system 111, the seller may begin to configure the order 131 for shipment. In an embodiment, the seller may configure the order 131 using the user interface 141 of FIG. 1B. When the prediction of shipping attributes is authorized (e.g., through selection and configuration of the control 145A), the attribute prediction engine 137 of the shipping management system may be used to predict the shipping attributes 143. In an embodiment, the user interface 141 may be provided via a standalone application executing on the seller/customer/shipper system 140, and the interface of the shipping management system 111 may be used to facilitate communication between the seller/customer/shipper system 140 and the shipping management system 111 to obtain the predicted shipping attributes. For example, the seller/customer/shipper system 140 may make a function call to the interface of the shipping management system 111 requesting prediction of shipping parameters in connection with one or more orders, and, in response to receiving the request, the shipping management system 111 may predict one or more of the shipping attributes 143, and provide the predicted shipping attribute values to the seller/customer/shipper system 140. In an alternative or additional embodiment, the user interface 141 may be presented by the seller/customer/shipper system 140 via a web portal or web browser-based application provided by the operator of the shipping management system 111.

According to embodiments, the shipping attributes 143 may be predicted by rules in rule engine 113 of the shipping management system 111. Such predictions may be based on historical data 115 and details of the order 131, such as item type included in the order, weight, shipping origin zone, etc. For example, the historical data 115 may include information that indicates the past shipping behaviors of the seller (and/or other sellers) for various orders, and the rules of the rules engine 113 may be used to make accurate predictions based on observations determined from the past shipping behaviors. In an embodiment, the attribute prediction engine 137, in conjunction with the rules engine 113, may predict shipping attributes for orders using three components: 1) a training set, 2) an algorithm, and 3) a set of rules constructed by the algorithm using the training set as an input, where a rule, such as rules stored in rule engine 113, is of an implication form X→Y, such that if condition X occurs, Y is predicted. Once the rules contained in rule engine 113 are constructed based on the historical data 115 using an algorithm, the rules can be used to predict shipping attributes 143 for the order 131 (and other orders).

According to embodiments of the present invention, through user interface 141, a user may provide inputs to control the shipping management system 111 in connection with performing various functions, such as managing orders, managing the picking and packing of items for order fulfillment, generating invoices, packing slips, manifests, shipping labels, and/or postage indicia, and/or tracking shipment of items. User interface 141 may, for example, display details of shipping attributes 143, order 131, and control 145, as described above in connection with FIG. 1B. In an embodiment, the shipping attributes 143 can include attribute values that have been predicted by the rules in rule engine 113 of the shipping management system 111. Such predictions may, for example, be based on historical data 115 and details of the order 131 such as item type included in the order, weight, shipping origin zone, etc. Embodiments for shipment management systems are further enhanced by controls 145 to facilitate user intervention with the predicted attributes to correct any prediction errors or make changes to the predicted attributes due to the changing situations, even if the predicted attributes are correct. Exemplary aspects of using the attribute prediction engine 137 to predict shipping attribute values in accordance with embodiments of the present invention are described in more detail below with reference to FIG. 2.

In FIG. 1C, exemplary embodiments of components and devices that may be utilized by systems in connection with the offering of items for sale, the ordering items, and the managing of shipment of ordered items are shown. In FIG. 1C, the various systems operating with the system 100 are shown and includes the buyer system 120, the market place system 130, the seller/customer/shipper system 140, and the service provider systems 160. As shown in FIG. 1C, the various systems may utilize user devices 113A-113D, and computing resources 115A-115D. For example, the buyer system 120 can use user device 113D and/or user device 113E, the service provider systems 160 can use user device 113C and/or user device 113G, the market place system 130 can use user device 113F, user device 113B, and computing resource 115B, and seller/customer/shipper system 140 can use user device 113A, and computing resource 115A, 115C, and 115D. Additional details regarding the user devices 113A-113G, and the computing resources 115A-D are provided below. It is noted that, although not shown in FIG. 1C, the warehouse systems 150 of FIG. 1A may utilize user devices and computing resources similar to those shown in FIG. 1C. Further, it is noted that the various systems operating with the system 100 may utilize additional user devices and computing resources other than those shown in FIG. 1C. For example, one or more of the systems operating within the system 100 may utilize hand scanners, radio frequency tracking devices and tags, etc. in connection with facilitating orders and shipment of orders.

User devices 113A-113G of embodiments comprise processor-based systems (e.g., a terminal in the form of one or more computer, workstation, kiosk terminal, portable processor-based device, etc.) operable under control of one or more instruction set (e.g., software, firmware, applet, etc.) adapted to cooperate with system 100 to provide desired functionality, such as the aforementioned exemplary shipping management functionality. User devices 113A, 113B, 113E, 113F, and 113G of the illustrated embodiment, for example, comprise computer systems having a processor, memory, and input/output to enable interaction with the shipping management system 111 for providing at least some portion of functionality available through operation of the system 100. For example, user devices 113A, 113B, 113E, 113F, and 113G can be a PC having a processor, memory, suitable input/output (I/O) functionality, and operating system (OS)) operating under control of an instruction set. User device 113C of the illustrated embodiment, however, comprises a tablet device having a processor, memory, and input/output to enable interaction with the shipping management system 111 for providing at least some portion of functionality available through operation of system 100. User device 113D of the illustrated embodiment comprises a smart phone, such as a tablet device, a personal digital assistant (PDA), having a processor, memory, and input/output to enable interaction with shipping management system 111 for providing at least some portion of functionality available through operation of system 100. The communication links between the user devices 113A-113G and the other components of the system 100 (e.g., the shipping management system 111, the computing resources 115A-115D, and other ones of user devices 113A-113G) may comprise wired links (e.g., as illustrated for user devices 113A and 113B) or wireless links (e.g., as illustrated for user devices 113C and 113D), as well as combinations thereof. It should be appreciated that, although the illustrated embodiment shows a representative example of the number and configuration of user devices that may be utilized with respect to the system 100, the concepts of the present invention are not limited in application to the particular number or configuration of user devices shown.

From the foregoing it can be appreciated that user devices 113A-113G of embodiments comprise processor-based systems operating under control of one or more instruction set (e.g., software, firmware, applet, etc.) to provide operation as described herein. Such processor-based systems may comprise a central processing unit (CPU) (e.g., a processor from the PENTIUM or CORE line of processors available from Intel Corporation), memory (e.g., random access memory (RAM), read only memory (ROM), flash memory, disk memory, optical memory, etc.) storing the aforementioned one or more instruction set and/or other data used herein, and appropriate input/output circuitry and devices (e.g., network interface card (NIC), keyboard, digital pointer, display screen, peripheral interface, microphone, speaker, wireless interface, etc.).

Network 110 of the illustrated embodiment provides communication links facilitating communication among and between various systems and components of the system 100, such as the buyer system 120, the market place system 130, the seller/customer/shipper system 140, the warehouse systems 150 (not shown in FIG. 1C), and service provider systems 160, using various computing equipment such as user devices 113A-113G, and computing resources 115A-115D. Accordingly, the network 110 may comprise any number of network configurations, such as the Internet, an intranet, the public switched telephone network (PSTN), a local area network (LAN), a metropolitan area network (MAN), a wide area network (WAN), a cellular network, a wireless network, a cable transmission network, and/or the like.

Various peripherals and other computing resources useful in providing functionality available through operation of the system 100 may be coupled to or otherwise in communication with user devices of embodiments. For example, computing resources, such as one or more printer (e.g., thermal printer, ink printer, laser printer, etc.), imaging device (e.g., optical scanner, barcode scanner, handheld scanner, camera, biometric sample scanner, etc.), scale (e.g., electronic scale, digital scale), memory device (e.g., optical disk drive, hard disk drive, solid state disk drive, etc.), and/or the like, may be provided for use with any or all of the foregoing processor-based systems according to embodiments herein. Computing resources 115A and 115B, are shown in the illustrated embodiment as printers (e.g., printer for printing proof of payment indicia, bills of lading, manifests, receipts, shipping labels, etc.) that are coupled to user devices 113A and 113B, respectively. Similarly, computing resource 115C, shown as a scale (e.g., an electronic scale for weighing items for shipping), and computing resource 115D, shown as an imaging device (e.g., a scanner for obtaining images of shipping items, for scanning barcodes, for scanning addresses or other shipping item information, etc.), are shown as being coupled to user device 113A of the illustrated embodiment. Of course, configurations and deployments of computing resources different than that shown may be utilized according to embodiments of the invention.

Figure 2:
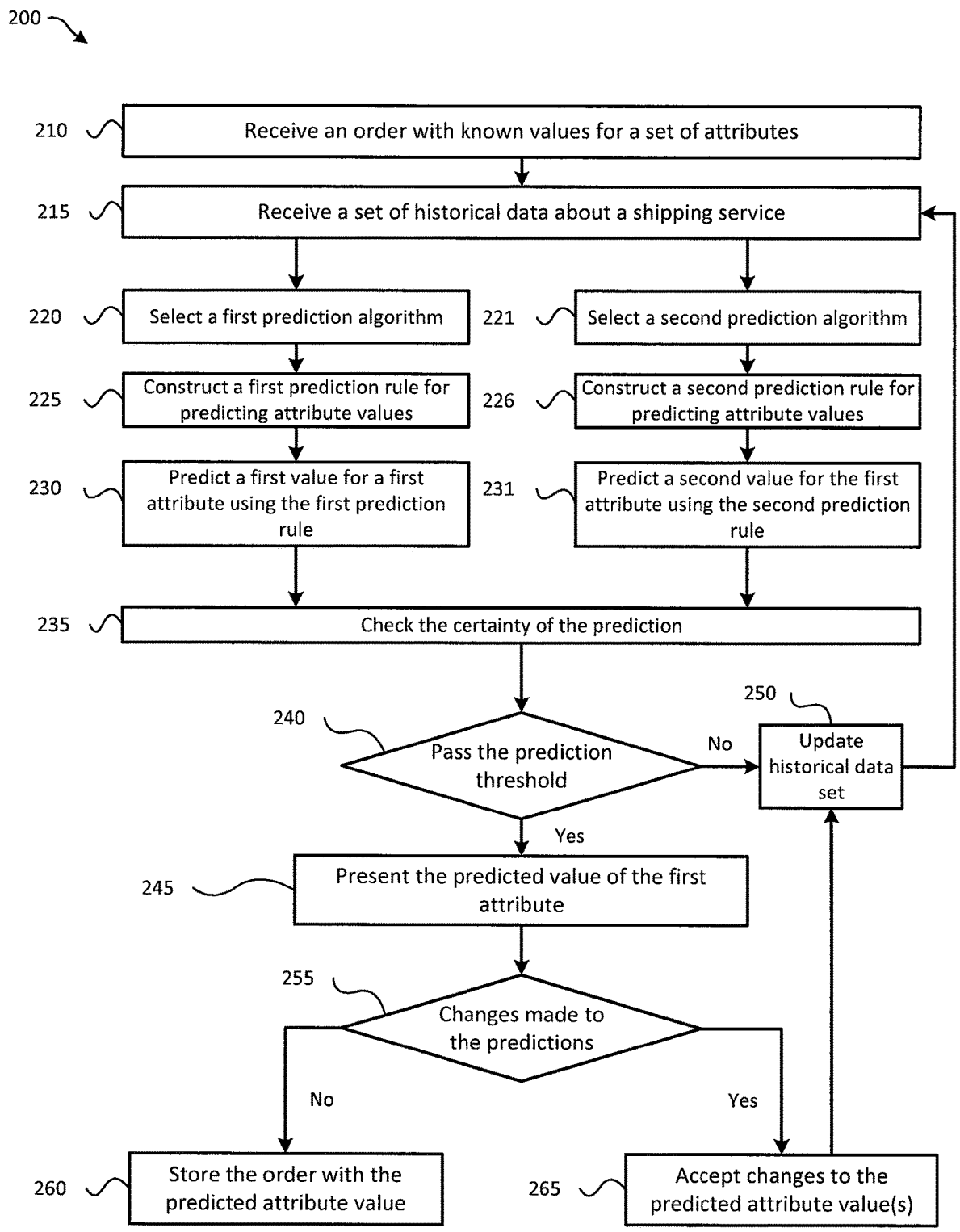
FIG. 2 is a flow diagram of a method for predicting shipping attributes and facilitating user control for orders to be shipped according to embodiments of the invention.

FIG. 2 shows a flow diagram of a method for predicting shipping attributes and facilitating user control for orders to be shipped according to embodiments of the invention, which may be executed by attribute prediction engine 137 of system 100 shown in FIG. 1A. In an embodiment, the method 200 of FIG. 2 may be performed by the shipping management system 111 of FIGS. 1A and 1C to predict shipping attributes in connection with one or more orders, such as the order 131 of FIGS. 1A and 1B. The operations illustrated and described in connection with FIG. 2 may be used to predict shipment attribute values, which may be enhanced or supplemented by user interventions (e.g., using the controls 145 of FIG. 1B). It is noted that the operations shown in FIG. 2 are for illustration purpose only and are not intended to be exhaustive or limiting. In particular, the operations can be executed in various operation orders not necessarily following the operation order shown in FIG. 2. For example, block 210 to "receive an order" can be executed after block 215 to "receive a set of historical data," or after block 225 to "construct a prediction rule for predicting attributes," etc.

At block 210 of the illustrated embodiment, an order with known values for a set of attributes may be received by a processor executing a program. In an embodiment, the order may be received by a program and processor of the shipping management system 111. In an embodiment, the order can be received from market place system 130 by the shipping management system 111, as described with reference to FIG. 1A. In an embodiment, the order can be received as a single order. In an additional or alternative embodiment, the order may be received as part of a group of orders. In an additional or alternative embodiment, the order can be received from the seller/customer/shipper system 140 of FIG. 1A when a seller initializes an order for the buyer. For example, if the buyer always buys a certain quantity of goods at a fixed time period, the seller can initiate such an order if, for example, the buyer fails to order the same quantity of goods for the predetermined period of time. In an embodiment, the set of attributes with known values received in the order at block 210 may be a subset of all possible attributes of an order. For example, in an embodiment, the set of attributes with known values may include one or more attributes included in the set of order attributes 131A-131I shown in FIG. 1B (e.g., including a weight, a shipping address, a price, a market place, a time, and/or promotion information).

According to embodiments of the invention, at block 215, a set of historical data about shipping services is received. In an embodiment, the historical data may be the historical data 115 of FIG. 1A, and may include data with respect to the past use of the shipping services, such as by a shipping carrier, a shipping services provider, a third part fulfillment house, other providers, etc. For example, the historical data may comprise empirical data with respect to the delivery time or service speed for one or more shipping services, one or more shipping service providers, etc. Such data may comprise data with respect to shipment from and/or to particular addresses, areas, zones, regions, etc. For example, the historical data may include information associated with shipments from a particular location (e.g., Los Angeles, Calif.) to one or more destinations (e.g., Kansas City, Mo., Seattle, Wash., Albany, N.Y., etc.), and may indicate metrics associated with 1) a duration of transport of various orders from the particular location to each of the one or more destinations, 2) whether the shipments of the various orders were delivered on time (e.g., within specified QoS parameters), whether any of the shipments were lost, 4) whether any of the shipments were damaged, and the like. Such metrics and historical data may be stored in a database accessible to the shipping management system 111 in some embodiments.

In an embodiment, the metrics may be classified according to various categories, such as various shipping QoS categories (e.g., categories representative of various values of the shipping QoS 131I of FIG. 1B), categories representative of various shipping carriers (e.g., categories representative of shipments with various shipping carriers indicated by the shipping service providers attribute 143A of FIG. 1B), categories representative of various shipping service programs (e.g., categories representative of shipments with various shipping service programs indicated by the shipping service programs 143B of FIG. 1B), categories representative of various shipping media (e.g., categories representative of shipments of items using various shipping media indicated by the package type attribute 143C of FIG. 1B), categories representative of shipments from various warehouses (e.g., categories representative of shipments originating from warehouses indicated by the warehouse 143F of FIG. 1B), or other classifications, or combinations thereof. The historical data may additionally or alternatively be utilized in determining availability or suitability of various shipping services in particular situations, such as through the analysis of shipments having a certain size, weight, volume, content, point of origin/destination to determine whether such shipments were satisfactorily/not satisfactorily conveyed using a particular shipping service (e.g., historically late, historically damaged, although published as a particular service was not available in the situation the service has historically been provided nevertheless, etc.).

Any or all of the aforementioned historical data may be expressly gathered, such as from one or more of the acquirer, provider, and/or shipping origin. For example, when initializing the shipping management system 111 of an embodiment herein, personnel of a shipping carrier and/or a shipping origin may provide data with respect to each shipping service available for shipping goods using the system 100, and may provide some or all of the above historical data in association therewith. Moreover, at least some portion of the historical data utilized according to embodiments of the invention may be determined implicitly by the shipping management system 111 by monitoring the ongoing shipments of items using the shipping services provided by various shipping carriers, mining historical data with respect to the shipments using the shipping services provided by various shipping carriers, harvesting data regarding the shipping services provided by various shipping carriers from public sources such as manufacturers' published rates, web sites, promotional items, etc., and/or shipping service provider's published data regarding shipping services. For example, published rates and/or restrictions/limitations associated with various shipping services may be obtained through online systems, such as systems maintained by the shipping carriers (e.g., USPS, UPS, Federal Express, etc.) as may be accessed by the shipping management system 111 via the network 110.

In some embodiments, only a portion of the historical data may be used to make shipping attribute predictions (e.g., based on shipments occurring in connection with orders over the prior two weeks, 90 days, or another configurable time period/interval), or based on shipments associated with a volume of orders (e.g., the last 100 orders or 1000 orders). For example, for a low volume seller who ships only five things a day, data over 14 days may not be enough to generate a rule. Instead, the method 200 may provide a sample size of 500 shipments. Various numbers regarding the volume of the historical data can be obtained by experience, or by feedback from using the rules generated in making predictions. In an embodiment, the historical data used for predictions with respect to a particular seller may be supplemented using historical data associated with orders shipped by other sellers (e.g., orders shipped by other sellers utilizing shipping carriers, shipping service programs, shipping media types, etc. similar to those used by the particular seller). This may be beneficial for smaller sellers that do not ship large quantities of orders on a regular basis, but that would still like to take advantage of shipping attribute predictions. It is noted that some embodiments may allow the seller to designate whether the historical data used in connection with predictions for the seller may be supplemented using shipping metrics and performance data obtained in connection with shipments by other sellers, and/or may allow a seller to indicate whether their shipments may be used to supplement historical data of other sellers. Furthermore, in some embodiments, the historical data may be adjusted dynamically under user control, as illustrated later when it is controlled by a prediction threshold.

According to embodiments of the invention, at block 220, a prediction algorithm is selected for constructing a prediction rule using the historical data. In an embodiment, the selection of the prediction algorithm can be done by a processor executing a program code within the shipping management system 111. Alternatively, the selection of the prediction algorithm can be done manually. In some embodiments, the prediction algorithm may be related to a maximum entropy algorithm, which is based on the principle that, subject to precisely stated prior data, the probability distribution which best represents the current state of knowledge is the one with largest entropy. In other embodiments, the prediction algorithm may be related to neural network algorithms, which are a family of statistical learning algorithms inspired by biological neural networks (i.e., the central nervous systems of animals, in particular the brain), and may be used to estimate or approximate functions that can depend on a large number of inputs and are generally unknown. In some embodiment, the prediction algorithm is selected based on a time of a shipment or a seasonality of a shipment. Therefore, at different times of the year, different prediction algorithms may be selected for identical orders containing of the same item(s). For example, one prediction algorithm may be picked for 11 months of the year (e.g., January through November), and another prediction algorithm may be picked for the month of December. Thus, embodiments may facilitate specification of rules that utilize different prediction algorithms to predict the shipping attribute values based on the month the shipment is made. Further, embodiments may facilitate specification of rules to cause different prediction algorithms to predict other shipping attributes based on conditions other than the month the shipment is made. For example, when the destination for the shipment, as indicated by the address 131C, indicates a particular destination (e.g., an address in Russia), the prediction algorithm may utilize a rule that may predict insurance should be applied to the shipment (e.g., because the historical data may indicate that shipments to addresses in Russia are often lost during transport).

At block 225 of the illustrated embodiment, a rule for predicting an attribute can be created. For some embodiments, the rule for predicting an attribute may be created by applying the selected prediction algorithm at block 220 to the set of historical data set received at block 215. Additionally or alternatively, a plurality of such rules can be created. Still alternatively, the rule for predicting an attribute can be created manually by the seller or the market place, based on what the seller or shipper (when a third party fulfillment house is used for shipment) does historically. In addition, a rule can be generated based on other rules that other users have manually created. For example, if a lot of users create a rule to insure a package when its value is over $1,000, such a rule can be generated for a particular user even if the particular user does not specify the rule explicitly. In general, a rule is of an implication form X→Y, such that when the condition X is satisfied by attributes of the order received at block 210, a prediction of Y is made for the order.

For an illustrated embodiment, different implementations of the rules can be available. For example, a prediction rule can be generated without user's awareness. In additional or alternative embodiments, a rule can be generated by the shipping management system 111, and then recommended to a user. For example, when a user is shipping something, if method 200 knows that with a certain degree of certainty that a user would normally insure the shipments, the method 200 can prompt a user with an insurance rule asking the user whether insurance is wanted.

At block 230 of the illustrated embodiment, an attribute (e.g., one of the shipping attributes 143 of FIG. 1B) can be predicted by applying the prediction rule constructed at block 225 to the order with known values for a set of attributes received at block 210. It is noted that, even though block 210 is placed ahead of block 225 in FIG. 2, the operations of block 210 can be performed after the operation of block 225 has been completed (i.e., the order with known values for a set of attributes can be received at block 210 after the prediction rule has been constructed at block 225). The prediction can be very fast in general. However, the prediction speed may depend on the number of attributes involved, and the communication between the network and the shipper. As explained above, a rule may be of an implication form X→Y such that, when the condition X is satisfied by the known attributes of the order received at block 210, a prediction of Y is made for the order. For example, if a rule to insure a package when its value is over $1,000 is created at block 225, and the order received at block 210 indicates it has a value over $1,000, then applying the rule to the order information will predict that insurance is needed for shipment of the order, since its value is over $1000.

The shipping attribute to be predicted by the rule may be selected from the shipping attributes shown in FIG. 1B, such as shipping service providers attribute 143A, shipping service program 143B, package type attribute 143C, insurance 143D, non-machinable 143E, warehouse 143F, confirmation level 143G, return label 143H, and postage account 143I. For example, when the attribute to be predicted is the shipping service program 143B, the predicted values may selected from among a set of values that includes FedEx ground, FedEx overnight, FedEx express, USPS standard, USPS first class mail, USPS priority, USPS express, and UPS. In an embodiment, the set of values from which the predicted value of the attribute is selected may be filtered in accordance with one or more other shipping attributes. For example, if the shipping service provider attribute 143A indicates that the shipping carrier for the order is FedEx, the value predicted for the shipping service program may be selected from among a set of values that includes FedEx ground, FedEx overnight, FedEx express (e.g., only shipping service programs offered by the carrier indicated by the shipping service provider attribute 143A). It is noted that predictions can be made for any attribute or combination of attributes associated with the order received at 210.

As shown in FIG. 2, in an embodiment, the method 200 can select a second prediction algorithm, at block 221, for constructing a second prediction rule at block 226 for predicting a second value of the same attribute predicted by the first prediction rule at block 225. At block 231, a second instance of the same or a different attribute can be predicted using the second prediction rule constructed at block 226. In embodiments, the method 200 may switch from using the first predicted attribute at block 230 to the second instance of the attribute predicted at block 231 depending on the timing or shipment situations. In some other embodiments, method 200 may present both prediction results at block 225 and at block 226 to the user via the user interface 141 and allow the user to choose which instance is to be used for the shipment.

From block 210 to block 230 and/or 231, automatic predictions of attributes are performed by method 200, which can save time and reduce errors. However, a completely automatic prediction system can produce prediction errors which are not acceptable for a practical shipping management system, since any uncorrected prediction errors in the actual shipment can cause financial damages and losses for the seller, while making buyers unhappy as well. Thus, the method 200 of embodiments may provide for user intervention in conjunction with automatic attribute predictions to correct any errors or make any changes to the predicted attribute values, which may make automatic predictions more useful. Blocks 235 to 270 of FIG. 2 are illustrative examples of providing user intervention in accordance with embodiments of the invention.

For example, a user can control when an automatic prediction can be used by setting a confidence level or threshold. A predicted attribute can be used or presented when the certainty for the predicted attribute reaches or surpasses the user determined confidence level. By setting a confidence level or threshold to control when a prediction is presented according to embodiments, the user effectively and dynamically decides or creates a training set that may be used for the predictions, since any shipments of orders processed before using the predicted attributes can be viewed as a part of the training set.

At block 235, a certainty of the predicted attribute is checked. In some embodiments, the certainty of the predicted attribute is calculated by counting a percentage of correct predictions among past predictions without considering the historical data. In other embodiments, the certainty calculation may consider at least a portion of the historical data. In some other embodiments, when the historical data set is small or none available at block 215, predictions can be made and recorded at the shipping management system 111 without being made known to the shipper, and the recorded predictions may be compared with the real values of the order selected or configured by the shipper so that a historical shipping data set can be built, and, at the same time, the certainty of the predictions can be increased.

At block 240 of the illustrated embodiment, the certainty of the predicted attribute is compared with a prediction threshold so that the attribute prediction engine 137 of FIG. 1A can determine whether or not to present the predicted attributes at the user interface 141. In an embodiment, the prediction threshold may be a value set by a user to indicate a desired percentage or confidence that the predictions is correct. In an additional or alternative embodiment, the prediction threshold may be decided or configured by the shipping management system 111 (e.g., based on other user's experiences or feedback). In some embodiments, the threshold may be configured to indicate a high degree of certainty (e.g., 95% or 98%) regarding the accuracy of the prediction. In some embodiments, a lower threshold, such as 50%, can be used as well. In an embodiment, the prediction threshold may be dynamically adjusted based on the user experience. In an additional or alternative embodiment, the prediction threshold can be set for each user or for a group of users. Thus, the prediction may be controlled on individual user or group of user basis. Moreover, in accordance with embodiments, a user can change the prediction threshold depending on the situations, making the shipping management system 111 more robust and dynamic.

According to embodiments, at block 245, when the certainty of the prediction calculated at block 235 is determined to satisfy the prediction threshold, at block 240, the predicted attribute may be presented to the user, so that the user can validate the predicted value(s) and/or make any changes or corrections. The presentation of the predict attributes can be done in various forms, such as presenting the predicted attributes simultaneously to the user via the user interface 141, as shown in FIG. 1B, and then allowing the user to accept or reject (e.g., using the controls 145) the predicted attribute values. Alternatively, the user may be prompted to confirm and/or modify predicted attribute values one at a time. Either or both of these presentations, as well as other combinations of presentation options, for presenting the predicted attributes can be included in the embodiments of the invention.

When the certainty of the prediction calculated at block 235 fails to pass the prediction threshold at block 240, the predicted attribute may not presented to the user. Additionally, when the prediction made at block 230 for order 131 fails to pass the prediction threshold at block 240, the method 200 may include updating the historical data set, at block 250, to produce an updated historical data set that may be used as a new historical data set for subsequent predictions at block 215. Based on the updated historical data set, updated rules can be generated at block 225, which can be used to make new predictions for other orders, which may be more accurate due to the updating performed at block 250. The updating of the historical data set at block 250 and/or the updating of the prediction rule at block 230 can be done automatically, such as after each prediction, or updated daily, or any other predetermined or dynamically configurable time period.

As explained above, embodiments may allow the user to change values of attributes for which predictions were made. At block 255, the method 200 can determine whether any changes have been made to the predicted attribute(s) presented at block 245. The predicted attributes may be presented at the user interface 141 of FIGS. 1A and 1B, and changes may be made by the user via the user interface 141, such as through selection of the controls 145C and 145D, or via another technique, such as manual entry of different values for the various attributes of the order. The changes to the attributes may by communicated to the shipping management system 111.

At block 260, if no changes are detected at block 255 (i.e., the user accepted or agreed with the predicted attributes), the predicted attributes can be stored (e.g., at a database) within the shipping management system 111 of FIG. 1A. In such cases, the user may do nothing to the predicted attributes (e.g., no manual input of attribute values), thus, saving time and reducing errors caused by manual data entry. In an embodiment, the method 200 can loop back to block 220 to make further predictions for other attributes using different rules. Alternatively or additionally, the method 200 can loop back to block 210 to make predictions for other orders using the same or a different historical data set as received at block 215.

At block 265, when a change is detected at block 255, the changes may be accepted and stored in shipping management system 111 to replace the predicted attributes. Furthermore, at block 270, the changes to the predicted attributes and the order information can be used to update the historical data set to produce an updated historical data set that can subsequently be used as the historical data set in block 215 for other predictions. As explained above, the prediction algorithm selected at block 220 can construct an updated rule based on the updated historical data set at block 215. In some embodiments, the shipping management system 111 or the user may decide to select a different prediction algorithm at block 220 to be applied to the updated historical data set, at block 215, based on the changes accepted at block 265.

In an embodiment, the method 200 can loop back to block 220 from block 260 when the predicted attributes are accepted without any changes. When at block 220, the method 200 can create a second rule for predicting a second attribute. Method 200 follows the same flow as described earlier, by selecting a second prediction algorithm for predicting the second attribute; constructing the second prediction rule at block 225, and predicting a second attribute at block 230 using the second prediction rule and known values of the set of attributes. After the prediction of second attribute, method 200 can similarly check a certainty of the predicted second attribute; present the predicted second attribute when the certainty of the predicted second attribute is higher than the threshold; and storing the predicted second attribute when there is no change received. Even though the prediction of only one attribute for one order is shown in FIG. 2, additional or alternative embodiments of the method 200 may predict more than one attribute at in parallel (e.g., at the same time), and/or predict attributes for more than one order in parallel. Additional examples of order attribute predictions that may be determined using the method 200 are described below.

In an embodiment, the method 200 may be used to determine a shipping service provider and/or a shipping service program to be used for shipment of an order (e.g., the order 131). For example, upon placing the order, the buyer may specify a particular QoS, such as two-day shipping. During operations according to the method 200, the shipping management system 111 may receive the order (e.g., at block 215), identify the QoS specified by the buyer, and may determine one or more shipping carriers offering shipping service programs that satisfy the QoS specified for the order. In an embodiment, the method 200 may be used to predict a shipping service program that is different from the specified QoS. For example, if the destination indicated by the address 131C indicates that the item(s) of the order are to be shipped to Los Angeles, Calif., the method 200 may predict attribute values indicating the shipping carrier for the shipment is California Overnight, and the shipping service program is an overnight shipping program, which is an updated shipping program relative to the QoS which indicated the buyer desired 2-day shipping. The method 200 may determine such attribute values based on a rule that indicates the cheapest shipping carrier and program meeting or exceeding the QoS provided by the buyer is to be used for shipment of orders, and the method 200, based on the historical data, may have determined that it was cheaper to utilize the overnight shipping service offered by California Overnight, rather than 2-day shipping programs offered by other carriers.

As another example, the method 200 may be used to predict package type attributes (e.g., the package type attribute 143C) for shipment of an order. For example, a rule may be specified, created, or otherwise determined based on analysis of the historical data to indicate that when an order for an item is considered fragile, two ounces should be added to the total weight of the order to account for additional packing materials (e.g., Styrofoam peanuts, bubble wrap, etc.) that may be provided to protect the item(s) of the order during transport.

From the foregoing, it has been shown that predicting attributes using the system 100 of embodiments may increase the speed at which orders may be configured for shipment. Additionally, predicting attributes and then providing user intervention in accordance with one or more embodiments, may further increase the reliability of configured shipments (e.g., increase the frequency at which shipments are configured correctly). Further, by dynamically updating the historical data based on detected user intervention with respect to predicted attributes, the operations of the shipping management system 111 may be improved. Thus, embodiments of the present invention improve the operations of systems utilized to facilitate the shipment of orders.

A typical shipping, mailing, or posting (collectively referred to herein as shipping) of various items, such as letters and parcels, using a shipping carrier, such as USPS, UPS, and FedEx, involves many steps. Such shipping often requires the shipper to obtain a suitable shipping container, such as an envelope, flat, box, etc. (collectively referred to herein as containers), place the item(s) to be shipped in the container, weigh the resulting item to be shipped, printing a shipping address label or other technique for applying delivery address information, obtain and apply suitable postage or other form of payment for shipping services provided by a shipping carrier, and printing suitable postage indicia before the shipped item(s) is introduced into the mail stream. Various systems have been developed that allow sellers or shippers, being individuals and/or businesses (collectively users), to generate and print postage indicia using personal computers and similar processor-based systems, to satisfy the postage for the shipment of an order.

Figure 3A:
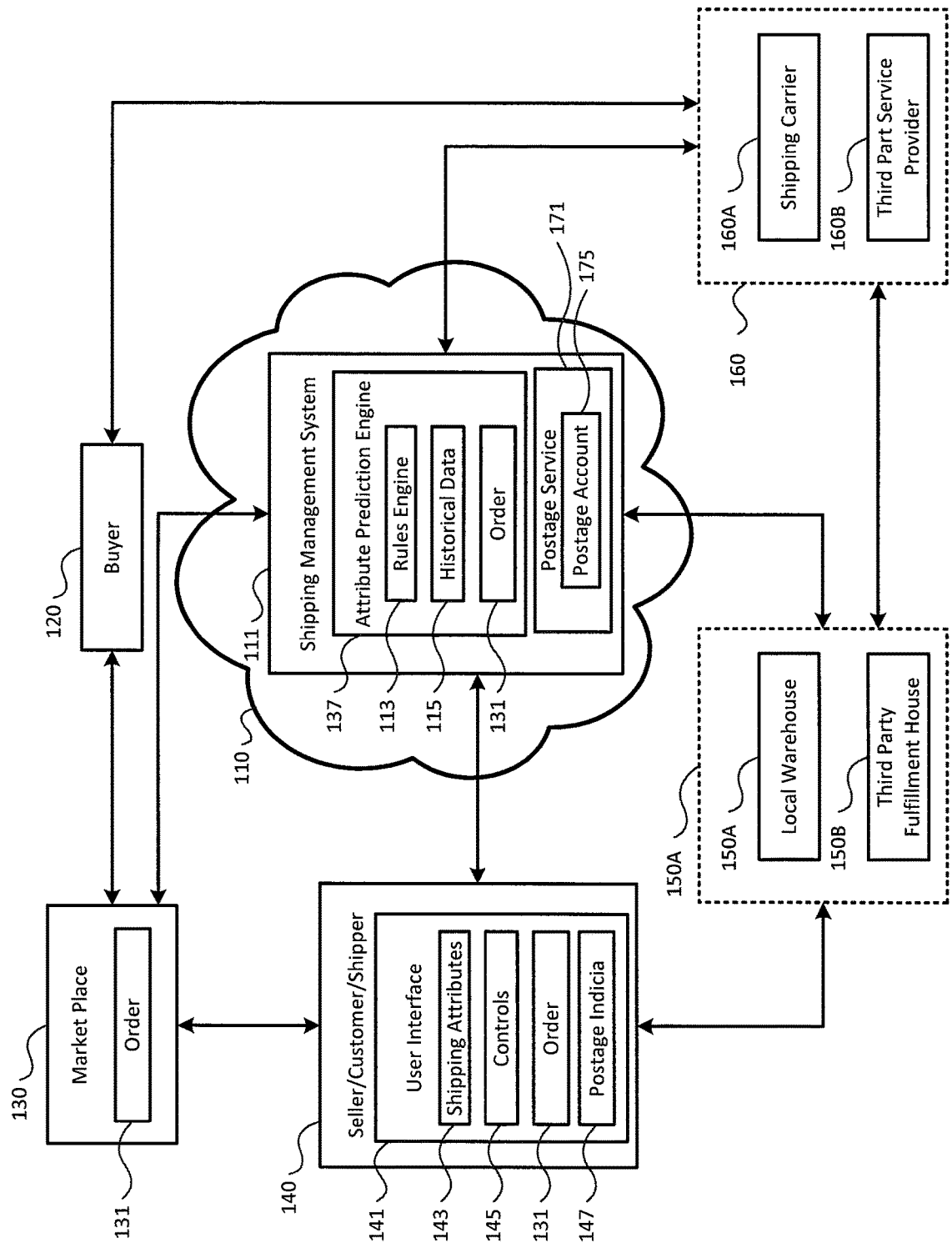
FIG. 3A illustrates additional aspects of systems and components to facilitate placement and shipment of orders according to embodiments of the invention.
Figure 3B:
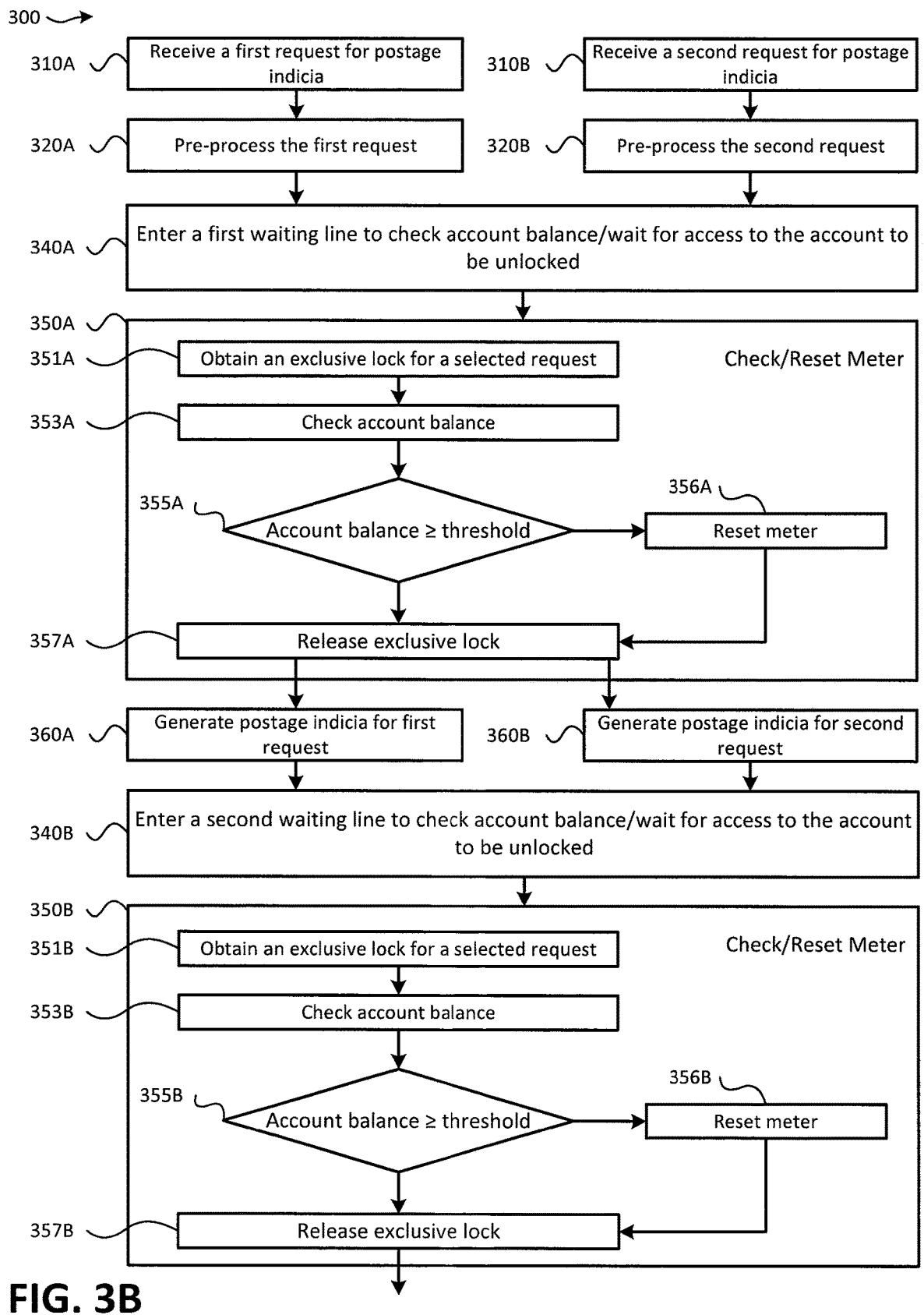
FIG. 3B is a flow diagram of a method for predicting postage account balance, and automatic postage purchasing while preparing an order shipment according to embodiments of the invention.

FIGS. 3A-3B illustrate embodiments of a commerce system and a flow diagram for predicting postage account balance, and automatic postage purchasing while preparing shipment of an order. In FIG. 3A, a diagram illustrating additional aspects of systems and components to facilitate placement and shipment of orders according to embodiments of the invention are shown. For example, in FIG. 3A, components related to postage that may be incorporated into the various systems of FIG. 1A are shown, such as a postage service system 171 containing postage account 175, and postage indicia 147 which may be generated for use by a seller (e.g., the operator of the seller/customer/shipper system 140). It is noted that although the postage service system 171 and postage account 175 are shown as being incorporated into the shipping management system 111, in an embodiment, the postage account 175 may be a meter or postage meter account provided by one of the service provider/carrier systems 160. For example, in an embodiment, the postage account 175 may be a meter account provided by a third party service provider system, such as Stamps.com Inc. In an embodiment, the attribute prediction engine 137 may be utilized to perform predictions on postage account balances as well as estimating postage for a shipment as described in more detail below.

In FIG. 3A, the postage service system 171 of the illustrated embodiment can administrate and manage the postage required in shipping the item(s) of the order 131. Postage service system 171 can maintain postage account 175 (a shipping account, a prepaid postage account, a meter account, or simply an account) for seller/customer/shipper system 140, where seller/customer/shipper system 140 can deposit money or funds into postage account 175, so that the seller can print postage indicia 147 for shipment of item(s) of the order 131. In some embodiments, a seller may have enough funds in postage account 175 to cover the cost of shipping the item(s) of the order 131.

Postage service system 171 may be a part of shipping management system 111, or a separate system from shipping management system 111 (e.g., one of the service provider/carrier systems 160). If postage service system 171 is a separate system, the seller/customer/shipper system 140 can communicate directly with postage service system 171. Additionally or alternatively, the shipping management system 111 can communicate with postage service system 171 on behalf of the seller/customer/shipper system 140 to purchase postage while preparing the shipment of order 131 and generating postage indicia 147. It may be desirable for seller/customer/shipper system 140 that shipping management system 111 can communicate directly with postage service system 171 during the shipment preparations, without the involvement of shipper system 140, so that less communication is performed, which can increase the overall speed of the shipment preparations.

Even when an individual has access to suitable printing equipment and label stock, the printing of a postage indicia, such as a label including a 2D barcode or other postage indicia, can be quite complex. For example, an individual may be required to remove paper stock from a printer, insert suitable label stock, launch a postage indicia application on a computer, input the required postage amount, generate the indicia data including encrypting the indicia, download the data for the order to the shipper machine, and print the postage indicia on a label, and stick the label bearing the postage indicia onto the package to be shipped. For a large seller/shipper who ships hundreds or thousands or more orders a day, the work and complexity can be tremendous. Often multiple users for the seller or shipper company are working in parallel to prepare and ship ordered items. The multiple users may often prepare the shipments using a shared postage account (e.g. postage account 175 associated with the shipper).

Various problems can occur when multiple users are sharing the same postage account. In some cases when one user is checking the balance of the account while another user is purchasing or replenishing the balance, the person that's checking the balance may get an incorrect indication of the current account balance. For example, five users may each separately check the account balance and determine that there is $200 in the account. Assuming each of the five users requires less than $200 in postage, each of the users may individually determine that the account possesses sufficient postage for their shipments. However, the aggregate amount of postage required by the five users may exceed the $200 balance, and, thus, the balance may not be sufficient to satisfy the shipping postage needs of the five users collectively.

Referring to FIG. 3B, a flow diagram of a method for predicting postage account balance, and automatic postage purchasing while preparing shipment of an order according to embodiments of the invention is shown as a method 300. According to embodiments, the method 300 utilizes two waiting lines (e.g., a first waiting line, shown at block 340A, and a second waiting line, shown at block 340B) to lock the shared postage account at different times, as indicated by blocks 350A and 350B, where blocks 350A and 350B act like an entry gate and an exit gate for multiple users. When someone is replenishing the balance, no one else can check the balance. They have to wait for that process to be completed before they can actually check the balance. Compared to having a single waiting line to lock the shared postage account at the last moment before purchasing the postage, having two waiting lines for two blocks of locking the shared account at the entry gate and the exit gate can shorten the wait time overall and make the system more productive. The method shown in FIG. 3B can be performed by postage service system 171 of FIG. 3A.

At block 310A, a first request is received for a postage indicia or a label generation for a first order associated with an account (e.g. the postage account 175). In an embodiment, there may be multiple postage indicia generation requests received. The account can be associated with a shipper or seller where the shipment is originated, and used for many shipments from the same shipper. When the shipper is ready to ship an item or a group of items to fulfill an order, the shipper may generate a postage indicia with enough postage in order to make the shipment. The postage required for a shipment may be determined by a shipping service provider or carrier using information associated with the order (e.g., a shipping origin location, a destination location, a weight of the shipment, a shipping service program to be used for the shipment, and the like). The shipper associated with the account may have many orders to be fulfilled, and many users can be working concurrently to fulfill the multiple orders from the same account, and may also be authorized to adjust the account balance. For example, as illustrated, a second request for a postage indicia generation may be received for a second order, at block 310B. The first request received at block 310A and the second request received at block 310B may be received in parallel or in sequence. Even though only two requests are shown at blocks 310A and 310B in FIG. 3B, there may be more than two requests received at the same time.

According to embodiments, pre-processing of the received requests may be performed, at block 320A and/or block 320B, to analyze postage requirements for errors and abnormalities, to check consistency of the shipping methods and postage requirement, and so on. For example, pre-processing may be configured to identify errors, such as when the first request received at block 310A includes an explicit postage purchase request, which may accidentally specify a request to purchase $2000 postage, instead of $200 postage. The pre-processing can identify such errors by looking at a normal amount of a postage request and prompt the user to correct or confirm the exact amount of postage to be purchased.

Block 340A of the illustrated embodiment can allow the received requests, such as the first request received at block 310A or the second request received at block 310B, to enter a waiting line to check an account balance (e.g. a balance of the postage account 175), where the request may wait for its turn to lock the shared postage account to perform operations such as checking the account balance, purchase postage, and so on. A waiting line may be implemented as a queue, a stack, a tree, or other forms of data structures. As illustrated in FIG. 3B, both the first request and the second request received at block 310A and block 310B may enter the same waiting line at block 340A. There may be multiple requests already in the waiting line when the shipper has multiple users generating shipment labels from the same account. The number of requests in the waiting line and the length of time that a request spends in the waiting line may depend on the speed of the requests being received, the speed at which the postage is prepared, and the speed at which the postage indicia is generated. When there is no previous request in the waiting line when a request is received, the received request can proceed directly to the next step. Otherwise, the received request waits in the waiting line for the account to become unlocked.

According to some embodiments, block 350A comprises a sequence of actions which may lock the shared postage account, check the balance of the account, and/or fund the account. In other words, block 350A may act as an entry gate where the account is locked by a request entering block 350A. For example, at block 351A, a request may be selected from the first waiting line, and an exclusive lock may be obtained. The exclusive lock may lock the shipping management system 111 such that the operations included in block 350A are the only operations performed by the shipping management system 111 with respect to the postage account. The selection of the request from the first waiting line can be random, based on first in first out (FIFO) rule, based on the first in last out (FILO) rule, or some other selection rule or technique. At block 353A, the balance of the account (e.g., the postage account 175) may be checked for the selected request using information contained in the selected request to determine whether the balance is sufficient to satisfy the postage amount(s) included in the request. Since access to the postage account by the shipping management system 111 is locked, the balance obtained at block 353A may be free from interference caused by other users (or requests) accessing the postage account 175 at the same time.

At block 355A, a determination may be performed to determine whether or not the account balance is above a threshold relative to the amount of postage requested or indicated in the request that was selected at block 351A. In an embodiment, the threshold may be predetermined, and may be compared to the account balance less the amount of postage for the selected request. For example, in an embodiment, the threshold may require that the account balance be maintained at a threshold level (e.g., $50), and the determination at block 355A may determine whether the current account balance less the requested amount of postage would be greater than or equal to the threshold level (e.g., a determination of whether $50≥(current balance−requested postage amount). In an additional or alternative embodiment, the determination at block 355A may determine whether the current balance is greater than the requested amount of postage (e.g., current balance>requested postage amount). If the determination at block 355A satisfies the threshold, the exclusive lock may be released, at block 357A, and a next request may be selected from the first waiting line at block 351A. On the other hand, when the determination at block 355A indicates that the threshold is not satisfied, the method 300 may proceed to block 356A where the meter may be reset (e.g., additional funds may be deposited into the postage account 175). In an embodiment, the amount funded at block 356A can be a predetermined amount. In an embodiment, the predetermined amount may vary for different shippers. For example, shippers that frequently purchase $500 of postage per week may be required to fund the postage account, at block 356A, using a minimum increment of $500, while shippers that frequently purchase $50 of postage per week may be required to fund the postage account, at block 356A, using a minimum increment of $50. It is noted that other increments, frequencies, etc. may be used to determine the minimum funding increments and frequencies, and that such factors may vary from one shipper to the next. In an additional or alternative embodiment, the amount funded at block 356A can be a variable amount that is enough to cause the account balance to satisfy the threshold at block 355A.

After the meter has been reset at block 356A, the method 300 may proceed to block 357A, where the exclusive lock may be released and a next request may be selected from the first waiting line. Once the exclusive lock is released, the method 300 may select the next request from the first waiting line, at block 340A, and may begin processing the next request again starting at block 351A. It is noted that at block 360A, the method 300 includes initiating operations to generate postage indicia (or postage indicia data) for the selected shipping request (e.g., after the shipping request exits block 350A). Since generating postage indicia (or postage indicia data), at block 360A, may take a longer amount of time than the operations performed by the block 350A (e.g., checking the balance and/or funding the account), the shipping management system 111 may authorize multiple requests to be simultaneously processed to generate the requested postage indicia (or postage indicia data). For example, block 360A can generate postage indicia for the first request, while block 360B can generate postage indicia for the second request. In an embodiment, the postage indicia may be generated at block 360A and block 360B in parallel (e.g., simultaneously). In an additional or alternative embodiment, block 360A and block 360B can be performed in sequence. It is noted that even though only two blocks 360A and 360B are shown in FIG. 3B, more than two operations to generate a postage indicia can be carried out in parallel in accordance with embodiments.

Generating a postage indicia (e.g., at blocks 360A and 360B) may take a substantial amount of time relative to other aspects of the method 300, since it may involve many steps (not shown in FIG. 3B), such as providing details of the shipment (e.g., dimensions, weight, origin and destination information, shipping service type, etc.) to a shipping carrier system or third party service provider system, generating the postage indicia or postage indicia data by the shipping carrier system or the third party services system, printing the postage indicia and/or shipping label, and applying the postage indicia and/or shipping label to the shipment. In an embodiment, the method 300 may end when the postage indicia has been successfully created.

In an additional or alternative embodiment, after the postage indicia is generated, the request may enter a second waiting line, block 340B, where the second waiting line may be used to verify that the postage account balance still satisfies the threshold, as the postage account balance may have changed during the time consuming process of generating the postage indicia.

Accordingly, at block 351B the request may be selected from the second waiting line and an exclusive lock may be obtained, at block 351B. The exclusive lock obtained at block 351B may operate in a manner similar to the exclusive lock obtained at block 351A, and may lock the shipping management system 111 such that the operations included in block 350B are the only operations performed by the shipping management system 111 with respect to the postage account. As similarly stated above, the second waiting line may be implemented as a queue, a stack, a tree, or other forms of data structures. As explained above, there may be existing orders in the second waiting line at the time a new request enters the second waiting line such as when multiple users are utilizing the system 100 of embodiments to ship orders. If there are no previous orders in the second waiting line, however, the request may proceed directly to the next step without waiting.

At block 350B of the illustrated embodiment, the balance of the postage account may be checked in a manner similar to the operations explained above with respect to block 355A. For example, when the account is not locked by another request, block 351B may select a request from the second waiting line, obtain the exclusive lock, and check the balance of the postage account. As stated above, the exclusive lock may be a system-wide lock, even across multiple servers, to ensure there is only one request accessing the account at a time (e.g., to check the account balance, reset the meter, etc.), preventing any interference from other requests. The selection of the request from the second waiting line can be random, based on first in first out (FIFO) rule, based on the first in last out (FILO) rule, or based on some other selection rule. At block 353B, the balance of the account may checked for the selected request. Further, because the shared account is locked for the selected request, the balance obtained at block 353B is free from interference by other users at the same time.

At block 355B, a determination as to whether the account balance satisfies the threshold may be made in a manner similar to the operations described above with respect to block 355A. If the account balance satisfies the threshold, the method 300 may proceed to block 357B where the exclusive lock may be released, allowing the shipping management system 111 to perform similar operations with respect to additional requests from the first waiting line and/or the second waiting line. If the account balance does not satisfy the threshold, the method 300 may proceed to block 359, where the meter may be reset (e.g., the account balance associated with the postage meter or postage account may be funded with a predetermined or variable amount), and then the exclusive lock may be released, at block 357B. Performing account balance inquiries and resetting of the meter both before and after the postage indicia is generated may help ensure that the account balance is maintained at a suitable level for a seller/shipper's ordinary use. Thus, a shipper that on average purchases $100 of postage per day, may have threshold account balance levels set such that the meter is only reset, on average, once per day (e.g., by refunding the account whenever the balance drops below $100), or once per week (e.g., by using a larger funding amount each time the meter is reset), or another frequency that satisfies the seller/shipper's needs for postage while minimizing the frequency at which the meter is reset and the likelihood that there is insufficient balance to purchase postage in amounts that are within normal operating ranges.

Even though the steps and blocks are described in sequence, one or more of the steps of the method 300 may be performed out of sequence or may be omitted from the sequence. Additionally or alternatively, additional steps and blocks can be added into the sequence, while continuing to perform the desired functions of the method 300. The method 300 may be used to prevent race conditions that may occur with respect to the postage account used for generating the indicia or indicia data. For example, generating the indicia data or indicia is often a time consuming process relative to other aspects illustrated in FIG. 3B, such as checking the balance of the postage account or resetting the meter (e.g., providing additional funds to the postage account). Thus, when multiple users are generating postage indicia or postage indicia data, other users may be checking balances, which may or may not reflect the costs of the postage indicia or postage indicia data that is being created. This problem is further compounded by the fact that the shipping management system 111 is unable to exert control over the postage account, such as to prevent access to the postage meter, which is under the exclusive control of the respective shipping carrier or third party service provider (e.g., Stamps.com Inc.). Thus, while the respective users are utilizing the shipping management system 111 to interface with various shipping carriers systems and/or third party service provider systems to generate postage indicia or postage indicia data, the shipping management system 111 may lock the respective users into the first waiting line and/or the second waiting line to restrict access to the shipping carriers systems and/or third party service provider systems by the shipping management system 111, which may eliminate race conditions, as described above with reference to the method 300 of FIG. 3B.

Additionally, by checking the account balance both before and after the postage indicia or postage indicia data is generated, situations where the initial checks performed at block 350A indicate a sufficient postage account balance, but where the account balance falls below the threshold balance after or during the creation of the postage indicia or postage indicia data may be avoided or eliminated (i.e., because the meter will be reset if the checks performed at block 350B indicate that the postage account balance has fallen below the threshold balance). Further, it is noted that some shipping carriers and third party service providers may not utilize postage accounts (e.g., postage meters), and instead, may utilize a bill-to-account system whereby the user generates postage indicia and/or postage indicia data, and is later billed an amount representative of the aggregate value of the created postage indicia and/or postage indicia data over a period of time (e.g., a month, a week, a quarter, etc.). For such systems, the shipping management system 111 may not impose the locking techniques described in connection with FIG. 3B, and instead may allow multiple users unrestricted access to tools for generating postage indicia and/or postage indicia data.

Figure 4:
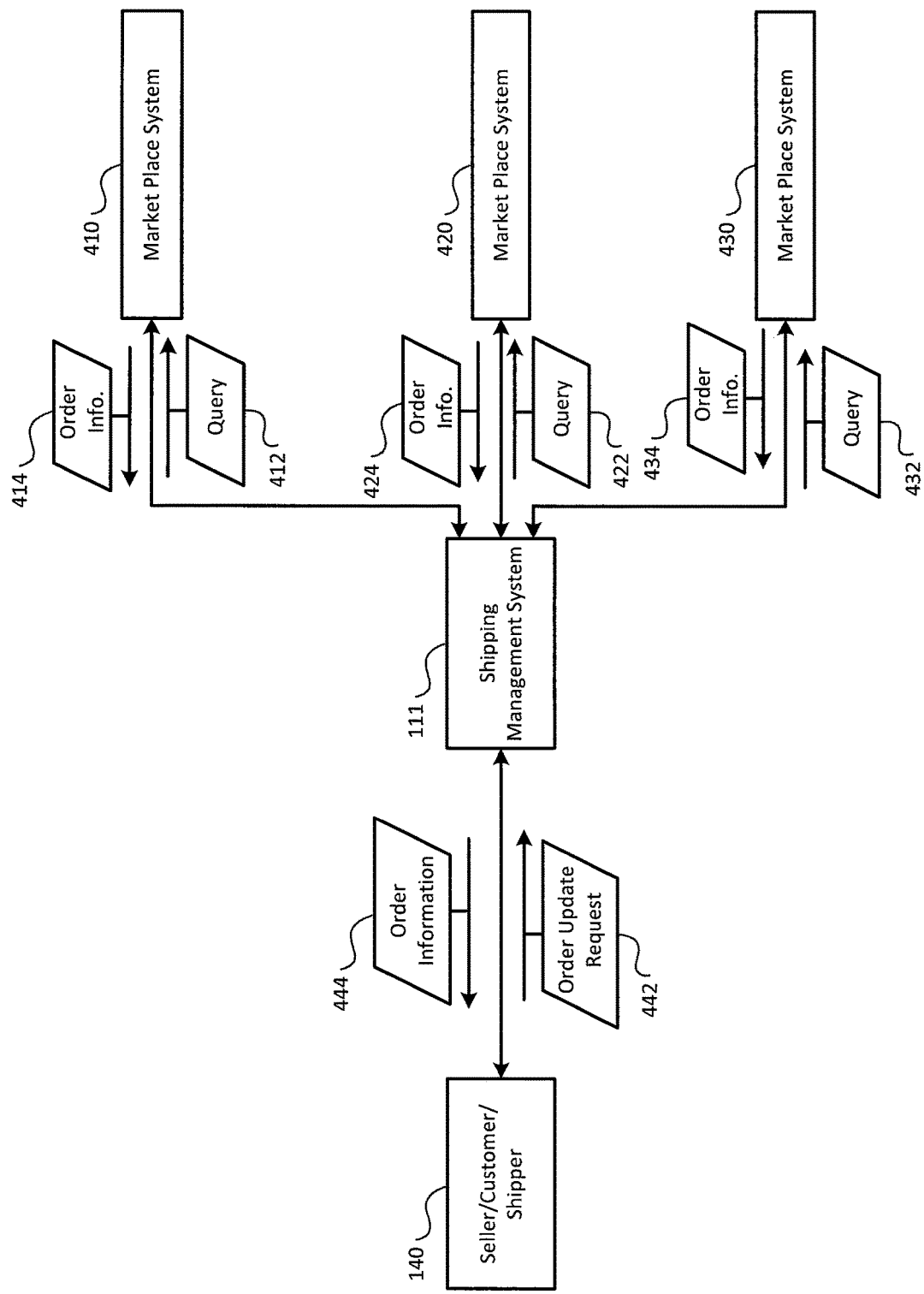
FIG. 4 is a block diagram illustrating aspects providing multi-channel functionality via a shipping management system according to embodiments of the invention.

Referring to FIG. 4, a block diagram illustrating aspects providing multi-channel functionality via a shipping management system according to embodiments of the invention is shown. In FIG. 4, the shipping management system 111 and the seller/customer/shipper system 140 of FIG. 1 are shown. Additionally, in FIG. 4, a plurality of market place systems are shown and include a first market place system 410, a second market place system 420, and a third market place system 430. Each of the plurality of market place systems may be configured as described above with respect to the market place system 130 of FIG. 1.

In an embodiment, the shipping management system 111 may be configured to periodically retrieve order information from select ones of the plurality of market place systems. In an embodiment, each of the plurality of market place systems may communicate with the shipping management system 111 using a native format that is unique to a respective market place system (e.g., different from formats used by other market place systems).

In an embodiment, the shipping management system 111 may include a market place interface configured to facilitate the retrieval of the order information from the plurality of market place systems. The market place interface may be a hardware interface, an API interface or another type of software interface, or a combination thereof. In an embodiment, the market place interface retrieves the order information by generating a plurality of queries. Each of the plurality of queries may be generated using a single function call in format native to a particular one of the plurality of market place systems. For example, in an embodiment, the plurality of queries may include a first query 412 generated using a first function call format native to the first market place system 410, a second query 422 generated using a second function call format native to the second market place system 420, and a third query 432 generated using a third function call format native to the third market place system 430.

In an embodiment, the shipping management system 111 may include a mapping interface configured to map commands (e.g., order retrieval commands) to native formats of the respective ones of the plurality of market place systems to generate the queries. For example, the market place interface may communicate with the mapping interface to generate the plurality of queries. In an embodiment, the mapping interface may be provided as a hardware interface, an API interface or another type of software interface, or a combination thereof. In an embodiment, the mapping interface and the market place interface may be components of a same interface. In an additional or alternative embodiment, the mapping interface and the market place interface may be separate interfaces. The mapping interface may be configured to map information from a format compatible with the shipping management system 111 to a format compatible with other interfaces or interface components utilized by the shipping management system 111 (e.g., the market place interface) and/or formats compatible with respective ones of the plurality of market place systems and the seller/customer/shipper system 140.

For example, the mapping interface may identify function calls and associated parameters that may be provided to the market place systems 410, 420, 430, respectively, to facilitate the retrieval of the appropriate order information. In an embodiment, the mapping interface may generate the queries 412, 422, 432 using the identified function calls and parameters, and may pass the queries 412, 422, 434 to the market place interface for transmission to the respective market place systems 410, 420, 430. In an additional or alternative embodiment, the mapping interface may provide information representative of the respective function calls and parameters to the market place system interface, and the market place system interface may generate the queries 412, 422, 432. Thus, the mapping interface may facilitate translation of information in format native to one or more information sources (e.g., one or more of the seller/customer/shipper system 140, the market place systems 410, 420, 430, the shipping management system 111, etc.) to a format native to one or more destinations for the information. In an embodiment, a database of the shipping management system 111 may include a lookup table that may be used by the mapping interface to translate information. In additional or alternative embodiments, other techniques, such as data structures, database tables, or other data constructs may be used, alone or in combination, to provide information translation in accordance with embodiments.

In response to generating the queries 412, 422, 432, the market place system interface may initiate transmission each of the queries 412, 422, 432 to a respective one of the plurality of market place system. For example, the first query 412 may be transmitted to the first market place system 410, the second query 422 may be transmitted to the second market place system 420, and the third query 432 may be transmitted to the third market place system 430. In response to receiving the respective queries 412, 422, 432, the plurality of market place systems may initiate transmission of order information to the shipping management system 111. For example, in response to receiving the first query 412, the first market place system 410 may initiate transmission of order information 414 to the shipping management system 111. As another example, in response to receiving the second query 422, the second market place system 420 may initiate transmission of order information 424 to the shipping management system 111. Similarly, the third market place system 430 may initiate transmission of order information 434 to the shipping management system 111 in response to receiving the third query 432. In response to receipt of the order information, the shipping management system 111 may store the order information in a database of or accessible to the shipping management system 111.

The order information 414 may include information identifying one or more orders of items offered for sale by the operator of the seller/customer/shipper system 140 via the first market place system 410. The order information 424 may include information identifying one or more orders of items offered for sale by the operator of the seller/customer/shipper system 140 via the second market place system 420. The order information 434 may include information identifying one or more orders of items offered for sale by the operator of the seller/customer/shipper system 140 via the third market place system 430. In an embodiment, the orders identified in the order information 414, 424, 434 may include information representative of one or more attributes (e.g., one or more of the order attributes 131A-131I of FIG. 1B, one or more of the shipping attributes 143 of FIG. 1B) associated with each of the respective orders. In an embodiment, the shipping management system 111 may be configured to predict one or more shipping attributes for each of the orders identified in the order information 414, 424, 434 using the techniques described above with reference to FIGS. 1-3.

The operator of the seller/customer/shipper system 140 may desire to update order information stored at the seller/customer/shipper system 140 to reflect a current status of order information associated with one or more items offered for sale by the operator via the market place systems 410, 420, 430. To update the order information at the seller/customer/shipper system 140, the operator may configure one or more device of the seller/customer/shipper system 140 to generate and transmit an order update request 442 to the shipping management system 111, or may initiate the creation and transmission of the order update request 442 manually.

In an embodiment, the order update request 442 may be generated using a single function call formatted according to a format specified by the operator of the shipping management system 111. For example, in embodiment utilizing an API implementation, the format of the order update request 442 may be designated in an API specification or software development kit (SDK) provided by the operator of the shipping management system 111. In an additional or alternative embodiment, the format may specify parameters for configuring particular ports, sockets, internet protocol (IP) addresses, or other parameters that may be used to configure a connection between the seller/customer/shipper system 140 and the shipping management system 111 to facilitate the update of the order information at the seller/customer/shipper system 140.

The order update request 442 may be received by the shipping management system 111. In response to receiving the order update request 442, the shipping management system 111 may transmit order information 444 to the seller/customer/shipper system 140, where the order information 444 includes at least a portion of the order information 414, at least a portion of the order information 424, at least a portion of the order information 434, or a combination thereof. In an embodiment, the shipping management system 111 may initiate multiple transmissions of order information to the seller/customer/shipper system 140. For example, in an embodiment, one or more of the market place systems 410, 420, 430 may impose throttling restrictions that limit the number of requests that the shipping management system 111 may submit to the respective market place systems, or that may limit the amount of information that may be retrieved by the shipping management system 111 during a time period. Thus, to retrieve all relevant orders from a respective market place system, multiple queries (e.g., multiple queries 412, 422, and/or 432) may need to be transmitted, and the order information may be received at the shipping management system 111 as a result of multiple transmissions between the shipping management system 111 and the respective market place systems 410, 420, 430. Thus, in an embodiment, retrieval of the order information by the shipping management system 111, and the providing of the information representative of the orders from the shipping management system 111 to the seller/customer/shipper system 140 may be performed asynchronously.

In an embodiment, the shipping management system 111 may be configured to provide the order information 444 to the seller/customer/shipper system 140 in a common format, despite the order information potentially being received at the shipping management system 111 in a plurality of different formats. For example, as explained above, each of the market place systems 410, 420, 430 may be configured to use a format native to each of the respective market place systems. Thus, when the shipping management system 111 receives the order information 414, 424, 434 from the respective market place systems 410, 420, 430, the order information may be formatted accordingly. That is, the order information 414 may be formatted according to the native format of the market place system 410, the order information 424 may be formatted according to the native format of the market place system 420, and the order information 434 may be formatted according to the native format of the market place system 430. Upon receipt of the order information 414, 424, 434, the shipping management system 111 may be configured to store the order information in a format native to the shipping management system 111. In an embodiment, the mapping interface may be utilized to convert the order information 414, 424, 434 to the format native to the shipping management system 111. After converting the order information 414, 424, 434 to the format native to the shipping management system 111, the order information may be stored in a database of or accessible to the shipping management system 111. Thus, when the order information 444 is provided to the seller/customer/shipper system 140, the order information 444 may be provided in a common format (e.g., the order information 414, 424, 434 may be provided in a single format that is native to the shipping management system), which may simplify the incorporation of the order information 444 into various sub-systems (e.g., an accounting system, etc.) of the seller/customer/shipper system 140.

In an embodiment, the order update request 442 may be received at, or provided to a shipper-side interface of the shipping management system 111. The shipper-side interface may be an interface designated to receive communications from and transmit communications to seller/customer/shipper system 140, and may be implemented in hardware, as a part of an API of the shipping management system, via another form of software implementation, or a combination thereof. By designating the shipper-side interface as the primary interface for communications between the seller/customer/shipper system 140 and the shipping management system 111, the operator of the seller/customer/shipper system 140 may only need to configure the seller/customer/shipper system 140 to communicate with the shipping management system 111, rather than configuring the seller/customer/shipper system 140 to communicate with each of the plurality of market place systems 410, 420, 430 that the operator utilizes in its ordinary course of business. Thus, the amount of programming/configuration of the seller/customer/shipper system 140 by the operator may be minimized. Further, by allowing the operator of the seller/customer/shipper system 140 to import data from the shipping management system 111, the operator may more easily and seamlessly manage its shipping operations, updates its records (e.g., accounting records, sales records, inventory records, etc.), and perform other functions that may benefit from localization of information from disparate sources (e.g., the plurality of market place systems 410, 420, 430, and the shipping management system 111) at the seller/customer/shipper system 140. From the operations described above in connection with FIG. 4, it can be seen that the shipping management system 111 of embodiments provides a multi-channel shipping management system that provides integration of information from a plurality of sales channels (e.g., the plurality of market place systems 410, 420, 430) to the seller/customer/shipper system 140 via the shipping management system 111.

Figure 5:
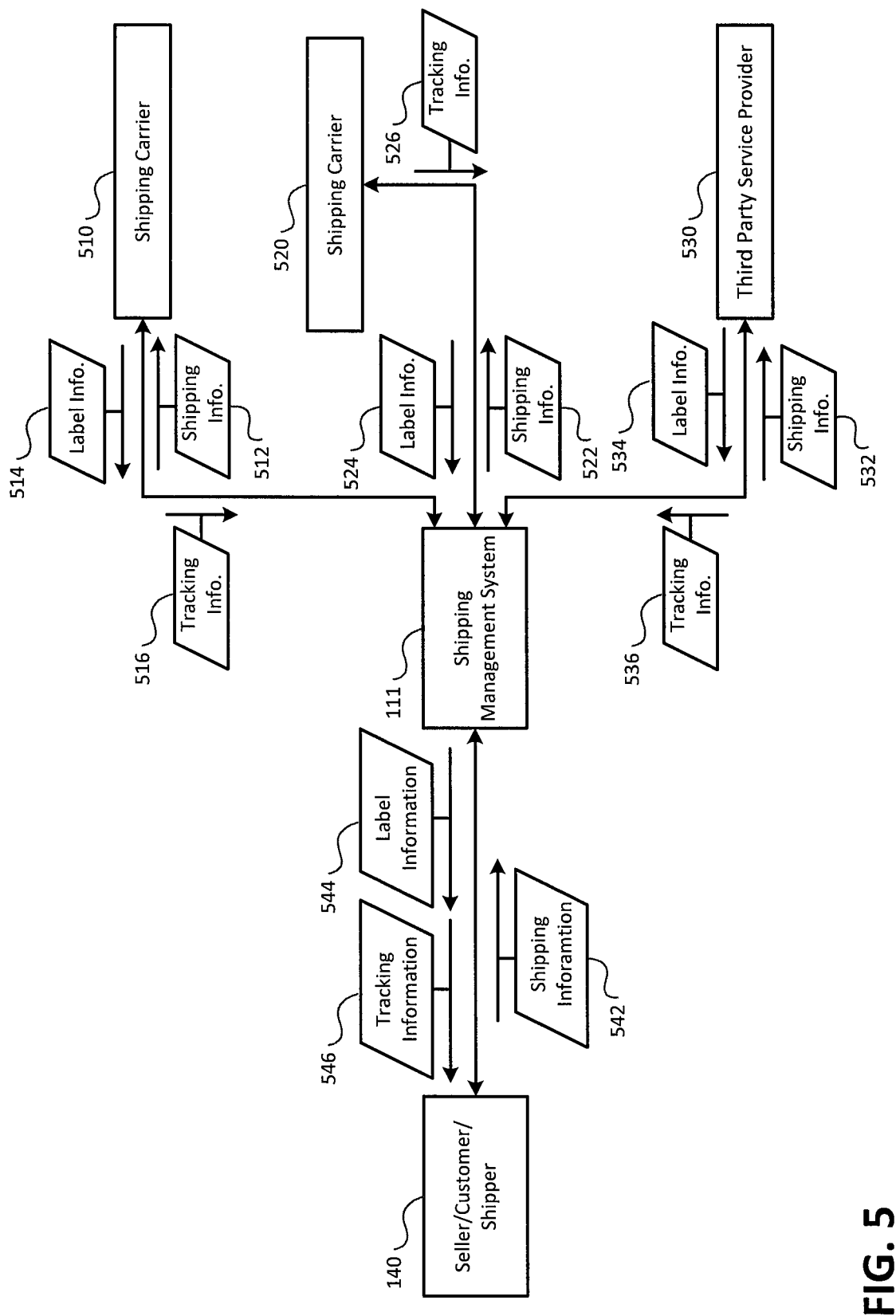
FIG. 5 is a block diagram illustrating aspects providing multi-carrier functionality via a shipping management system according to embodiments of the invention.

Referring to FIG. 5, a block diagram illustrating aspects providing multi-carrier functionality via a shipping management system according to embodiments of the invention is shown. In FIG. 5, a plurality of service provider/carrier systems are shown and include a first shipping carrier system 510, a second shipping carrier system 520, and a third party service provider system 530. In an embodiment, the third party service provider system may provide an online postage service, such as the online postage service provided by Stamps.com Inc. As explained above with reference to the plurality of service provider/carrier systems 160, a shipping carrier system may be a system associated with a shipping carrier (e.g., USPS, UPS, FedEx, DHL, Lone Star Overnight, etc.) that provides shipping services that include transport of shipped items through the mail stream from a point of origin to a destination, and a third party service provider system may be a system associated with an online postage service (e.g., Stamps.com Inc.) or other third party services (e.g., pack and ship service providers, shipping insurance service providers, etc.) that provides services associated with shipment of items (e.g., sale of postage indicia, packing materials, shipping supplies, etc.), but that do not provide transport of shipped items through the mail stream.

In an embodiment, the shipping management system 111 may include a shipping interface configured to facilitate the creation of shipping information via the plurality of shipping systems 510, 520, 530. The shipping interface may be a hardware interface, an API interface or another type of software interface, or a combination thereof. In an embodiment, the shipping interface may initiate creation of the shipping information by generating a plurality of queries. Each of the plurality of queries may be generated using a single function call in format native to a particular one of the plurality of shipping systems. For example, in an embodiment, the plurality of queries may include a first query 512 generated using a first function call format native to the first shipping carrier system 510, a second query 522 generated using a second function call format native to the second shipping system 520, and a third query 532 generated using a third function call format native to the third party service provider system 530.

In an embodiment, the shipping management system 111 may include a mapping interface (e.g., the mapping interface described in connection with FIG. 4) configured to map commands (e.g., shipping information creation commands)

to native formats of the respective ones of the plurality of shipping systems to generate the queries. For example, the shipping interface may communicate with the mapping interface to generate the plurality of queries. In an embodiment, the mapping interface may be provided as a hardware interface, an API interface or another type of software interface, or a combination thereof. In an embodiment, the mapping interface, the shipping interface, and the market place interface may be components of a same interface. In an additional or alternative embodiment, the mapping interface, the market place systems interface, and the shipping interface may be separate interfaces. The mapping interface may be configured to map information from a format compatible with the shipping management system 111 to a format compatible with other interfaces or interface components utilized by the shipping management system 111 (e.g., the shipping interface) and/or formats compatible with respective ones of the plurality of shipping systems and the seller/customer/shipper system 140.

For example, the mapping interface may identify function calls and associated parameters that may be provided to the shipping systems 510, 520, 530, respectively, to facilitate the creation of the appropriate shipping information (e.g., shipping labels, postage indicia, bills of lading, packing slips, customs forms, etc.). In an embodiment, the mapping interface may generate the queries 512, 522, 532 using the identified function calls and parameters, and may pass the queries 512, 522, 534 to the shipping system interface for transmission to the respective shipping systems 510, 520, 530. In an additional or alternative embodiment, the mapping interface may provide information representative of the respective function calls and parameters to the shipping system interface, and the shipping system interface may generate the queries 512, 522, 532. Thus, the mapping interface may facilitate translation of information in a format native to one or more information sources (e.g., one or more of the seller/customer/shipper system 140, the shipping systems 510, 520, 530, the shipping management system 111, etc.) to a format native to one or more destinations for the information. In an embodiment, a database of the shipping management system 111 may include a lookup table that may be used by the mapping interface to translate information. In additional or alternative embodiments, other techniques, such as data structures, database tables, or other data constructs may be used, alone or in combination, to provide information translation in accordance with embodiments.

In response to generating the queries 512, 522, 532, the shipping system interface may initiate transmission each of the queries 512, 522, 532 to a respective one of the plurality of shipping system. For example, the first query 512 may be transmitted to the first shipping carrier system 510, the second query 522 may be transmitted to the second shipping carrier system 520, and the third query 532 may be transmitted to the third party service provider system 530. In response to receiving the respective queries 512, 522, 532, the plurality of shipping systems may initiate transmission of shipping information to the shipping management system 111. For example, in response to receiving the first query 512, the first shipping carrier system 510 may initiate transmission of label information 514 and tracking information 516 to the shipping management system 111. As another example, in response to receiving the second query 522, the second shipping carrier system 520 may initiate transmission of label information 524 and tracking information 526 to the shipping management system 111. Similarly, the third party service provider system 530 may initiate transmission of label information 534 and tracking information 536 to the shipping management system 111 in response to receiving the third query 532. In an embodiment, the label information 514, 524, 534 may include postage indicia data, that may be used to generate postage indicia (e.g., a 2D barcode or other form of postage). In an additional or alternative embodiment, the label information 514, 524, 534 may include postage indicia. In still another additional or alternative embodiment, a portion of the label information (e.g., the label information 514, 524) may include postage indicia data and another portion of the label information (e.g., the label information 534) may include postage indicia. In a further additional or alternative embodiment, some or all of the label information 514, 524, 534 may include information representative of a completed shipping label that may include the indicia.

In response to receipt of the order information, the shipping management system 111 may store the order information in a database of or accessible to the shipping management system 111. In an embodiment, the shipping management system 111 may be configured to predict one or more shipping attributes for each of the orders for which shipping information is obtained using the techniques described above with reference to FIGS. 1-3. Additionally, any postage indicia and/or accounts that are accessed in connection with obtaining the label information/tracking information may be processed according to the techniques described in connection with FIG. 3.

In an embodiment, the label information 514, 524, 534 and the tracking information 516, 526, 536 may be generated in response to a request received from an operator of the seller/customer/shipper system 140. For example, the operator of the seller/customer/shipper system 140 may desire to generate shipping information for one or more orders. To generate the shipping information, the operator of the seller/customer/shipper system 140 may configure one or more device of the seller/customer/shipper system 140 to generate and transmit a shipping information request 542 to the shipping management system 111, or may initiate the creation and transmission of the shipping information request 542 manually. The label information 514, 524, 534 and the tracking information 516, 526, 536 may be provided to the seller/customer/shipper system 140 as label information 544 and tracking information 546, respectively. In an embodiment, the label information 544 may include postage indicia data that may be used to generate postage indicia. In an additional or alternative embodiment, the label information 544 may include postage indicia. In another additional or alternative embodiment, the label information 544 may include both postage indicia data and postage indicia.

In an embodiment, the shipping information request 542 may be generated using a single function call formatted according to a format specified by the operator of the shipping management system 111. For example, in embodiment utilizing an API implementation, the format of the shipping information request 542 may be designated in an API specification or software development kit (SDK) provided by the operator of the shipping management system 111. In an additional or alternative embodiment, the format may specify parameters for configuring particular ports, sockets, internet protocol (IP) addresses, or other parameters that may be used to configure a connection between the seller/customer/shipper system 140 and the shipping management system 111 to facilitate creation of shipping information on behalf of the operator of the seller/customer/shipper system 140. Once the shipping information is received at the shipping management system 111, the shipping information may be stored at the shipping management system 111 (e.g., in a database), and may further be communicated to the seller/customer/shipper system 140. Additionally, in an embodiment, the shipping management system 111 may be configured to provide at least a portion of the shipping information to the market place systems 410, 420, 430, such as to provide a tracking number to the buyer associated with an order to enable the buyer to learn that the item has been shipped and to monitor the status of the order, as described with reference to FIG. 6.

From the description provided with reference to FIG. 5, it is seen that the shipping management system 111 of embodiments provides a multi-carrier configuration, whereby the shipping management system 111 communicates with a plurality of shipping carrier systems and shipping service provider systems to generate shipping labels, postage indicia, bills of lading, packing slips, customs forms, etc. In an embodiment, when interacting with the shipping carrier systems and/or the shipping service provider systems, the shipping management system 111 may implement a technique to lock an account associated with the respective system(s), such as the techniques described above with reference to FIG. 3. Further, the shipping management system 111 may enable creation of shipping labels, postage indicia, bills of lading, packing slips, customs forms, etc. using a bill-to-third party feature that allows the costs for creating the shipping labels, postage indicia, bills of lading, packing slips, customs forms, etc. to a third party. For example, when the seller/customer/shipper system 140 initiates creation of such information, parameters indicating a third party that is to be charged for the shipping and an account of the third party with the respective shipping carrier or shipping service provider may be provided to the shipping management system 111. The parameters may be passed to the shipping management system 111 as parameters of a function call to the interface of the shipping management system 111 (e.g., a function call to a hardware interface, an API interface, another type of software interface, or a combination of hardware and software interfaces).

Figure 6:
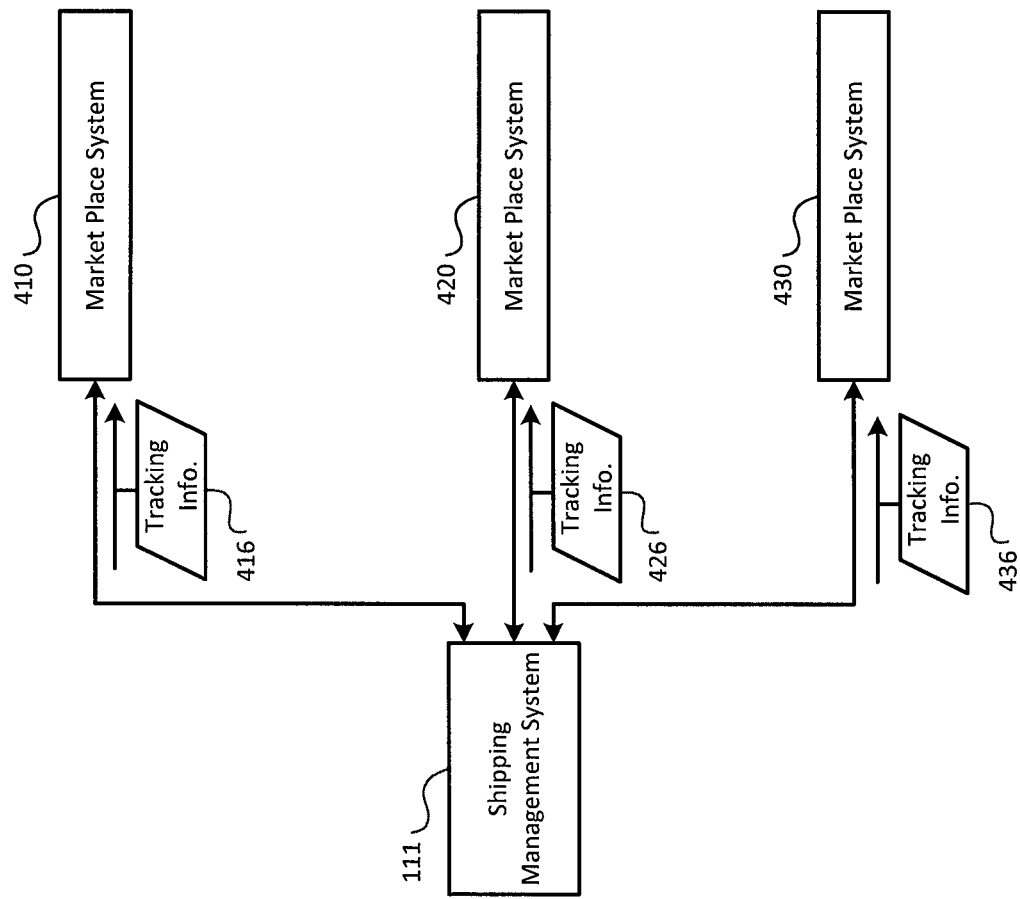
FIG. 6 is a block diagram illustrating aspects of pushing information associated with orders to market place systems according to embodiments of the invention.

Referring to FIG. 6, a block diagram illustrating aspects of pushing information associated with orders to market place systems according to embodiments of the invention is shown. As briefly explained above, the shipping management system 111 may be configured to retrieve information from market place systems, such as the first market place system 410, the second market place system 420, and the third market place system 430 of FIG. 4. As illustrated in FIG. 6, the shipping management system 111 may be configured to push tracking information to the plurality of market place systems. In an embodiment, the tracking information may be obtained during the creation of shipping labels for one or more orders, as described with reference to FIG. 5. In response to receiving the tracking information (e.g., the tracking information 516, 526, 536 of FIG. 5), the shipping management system 111 may be configured to push the tracking information to the respective market place systems 410, 420, 430.

In an embodiment, the tracking information may be formatted according to a native format of each of the respective market place systems 410, 420, 430. For example, in an embodiment, the mapping interface, the market place interface, or both of the shipping management system 111 may be configured to format the tracking information according to formats native to each of the respective market place systems 410, 420, 430. After formatting the tracking information according to the formats native to each of the respective market place systems 410, 420, 430, the shipping management system 111 may push the tracking information to the market place systems. For example, the shipping management system 111 may transmit tracking information 416 to the first market place system 410, and may transmit tracking information 426 to the second market place system 420. Additionally, the shipping management system 111 may transmit tracking information 436 to the third market place system 430. In an embodiment, the tracking information 416 may correspond to the tracking information 516, the tracking information 426 may correspond to the tracking information 526, and the tracking information 436 may correspond to the tracking information 536. In an embodiment, the shipping management system 111 may be configured to automatically providing the tracking information 516, 526, 536 to the respective market place systems 410, 420, 430, which may reduce the burden on the operator of the seller/customer/shipper system 140, who may otherwise be required to manually update such information at each of the respective market place systems 410, 420, 430.

In an embodiment, the shipping management system 111 may be configured to determine whether at least a portion of the tracking information was unsuccessfully transmitted to the respective market place systems, which may provide an indication that such tracking information is available to a buyer via the respective market place systems. If the shipping management system 111 determines that a portion of the tracking information has not been successfully transmitted, the shipping management system 111 may periodically retransmit the portion of the tracking information to the respective market place systems until transmission of the portion of the tracking information is successful. The shipping management system 111 may be configured to provide notifications to the seller/customer/shipper system 140 and/or warehouse systems 150, if any, regarding the successful uploading of the tracking information to the respective market place systems.

From the foregoing description of FIGS. 4-6, it is seen that shipping management systems (e.g., the shipping management system 111) configured according to embodiments provide a multi-carrier/multi-channel support for facilitating: 1) order retrieval from a plurality of sales channels (e.g., a plurality of market place systems), 2) creation of shipping documentation (e.g., shipping labels, postage indicia, bills of lading, packing slips, customs forms, tracking information, etc.) using a plurality shipping service provider systems and/or shipping carrier systems, 3) distribution of such information to relevant systems operating with the system 100 of FIG. 1 (e.g., retrieving the order information from each of the market place systems by the shipping management system 111, providing the order information to the seller/customer/shipper system 140, creating shipping documentation information relating to the orders identified by the order information using the shipping carrier and shipping service provider systems, and providing tracking information to the relevant market place systems). Thus, a shipping management system configured according to embodiments may be considered a multi-channel/multi-carrier shipping management system. Additional aspects and embodiments of features provided by a shipping management system in accordance with embodiments of the invention are further described below.

Figure 7:
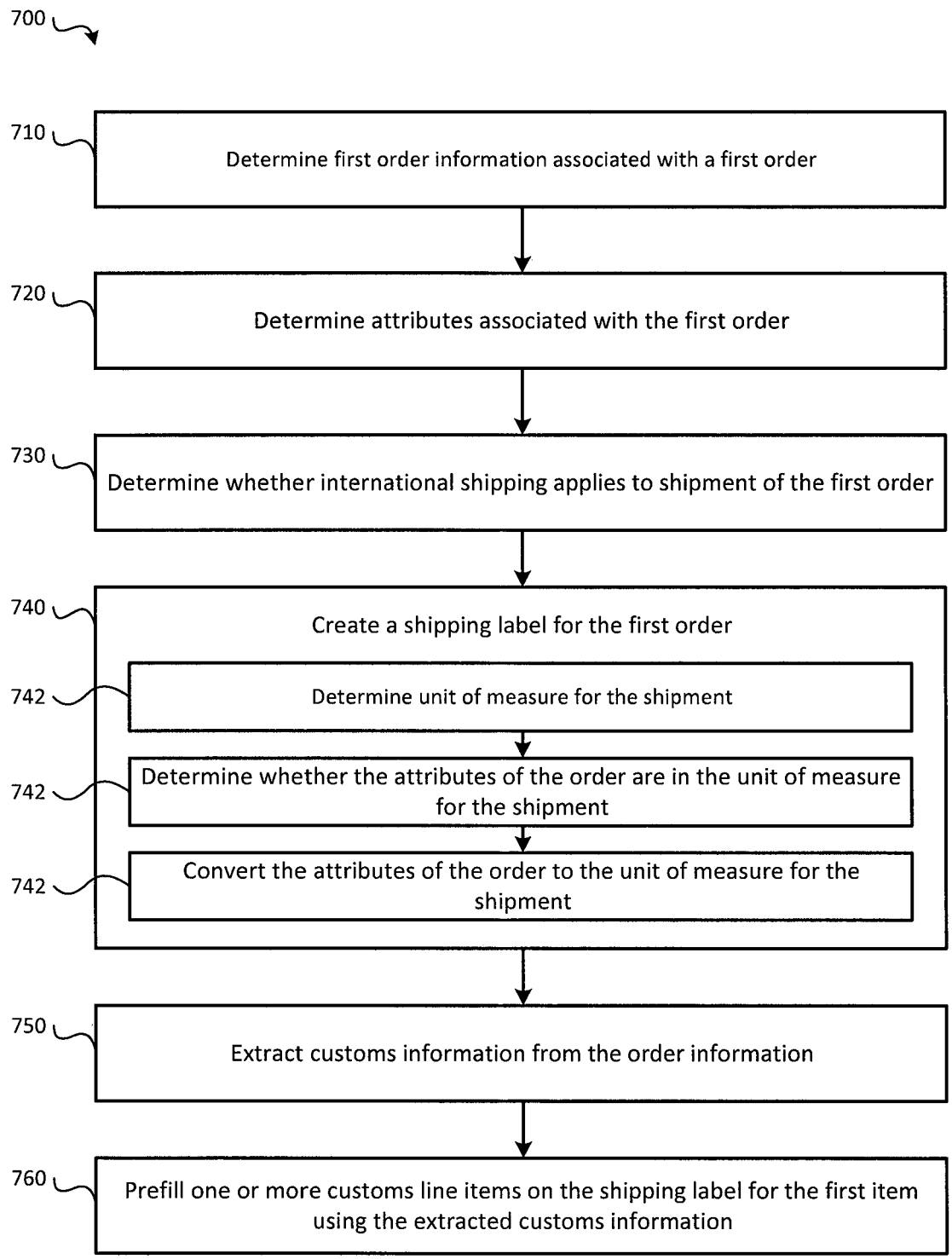
FIG. 7 is a flow diagram illustrating a method for configuring shipment of an international order using a shipping management system according to embodiments of the invention.

Referring to FIG. 7, a flow diagram illustrating a method for configuring shipment of an international order using a shipping management system according to embodiments of the invention is shown as a method 700. In an embodiment, the method 700 may be performed by the shipping management system 111 of FIGS. 1A and 4-6 in connection with the preparation of shipment of an order. In an additional or alternative embodiment, the method 700 may be performed by the seller/customer/shipper system 140, and/or by a warehouse system (e.g., one of the warehouse systems 150 of FIG. 1) in connection with the preparation of shipment of an order.

At block 710, the method 700 may include determining first order information associated with a first order. In an embodiment, the first order information may be determined in response to receiving a create shipping label request (e.g., the creating shipping label request 542 of FIG. 5) received at the shipping management system 111 from an external system (e.g., the seller/customer/shipper system 140 or one of the warehouse systems 150 of FIG. 1). In an additional or alternative embodiment, the first order information may be determined in response to an input received at a system (e.g., the seller/customer/shipper system 140 or one of the warehouse systems 150 of FIG. 1).

At block 720, the method 700 includes determining attributes associated with the first order. In an embodiment, the attributes may include order attributes (e.g., one or more of the order attributes 131A-131I of FIG. 1B) and shipping attributes (e.g., one or more of the shipping attributes 143 of FIG. 1B). In an embodiment, one or more of the order attributes and/or the shipping attributes may be determined using order information associated with the first order. For example, the order information may include information indicating a size and a weight of an item to be shipped in connection with the first order. Additionally, the order information may include shipping address information indicating a destination where the item is to be shipped, as may have been designated by a buyer who placed the first order. In an embodiment, the attributes of the order may be determined based on the order information associated with the first order (e.g., as may be determined by the shipping management system 111 from the order information stored at its database, or by the seller/customer/shipper system 140 or a warehouse system 150 based on order information imported from the shipping management system 111).

At block 730, the method 700 includes determining whether international shipping applies to shipment of the first order. In an embodiment, a determination of whether international shipping applies to shipment of the first order may be based at least in part on the shipping address determined from the order information. In an additional or alternative embodiment, additional information may be accounted for when determining whether international shipping applies to shipment of the first order. For example, an origin location corresponding to a location where the shipment of the first order may occur, such as a warehouse or other location where the first order is to be shipped from, may be accounted for in determining whether international shipping applies to shipment of the first order. As another example, a system (e.g., the shipping management system 111, the seller/customer/shipper system 140, and/or one of the warehouse systems 150) may store information indicating a capability of the shipper to originate shipments in multiple countries. If the information indicates that the shipper is capable of originating shipment of the first order in a same country as the shipping address for the first order, it may be determined that international shipping does not apply to shipment of the first order. However, when the information indicates that the shipper is not capable of originating shipment of the first order in the same country as the shipping address, it may be determined, at block 730, that international shipping applies to the first order. In an embodiment, the origin location for the shipment may be determined based in part on information indicating locations where one or more shipping warehouses are located. For example, the operator of the seller/customer/shipper system 140 may operate or utilize multiple warehouse locations at various geographic locations (e.g., different cities, states, countries, etc.) to facilitate shipment of items in connection with orders, and the location where the shipment of the first order is to originate may be selected as a location closest to the shipping address, subject to inventory constraints, as described in more detail below.

After determining whether international shipping applies to the shipment of the first order, the method 700 may include, at block 740, creating a shipping label for the first order. In an embodiment, the shipping label may be configured based at least in part on the attributes of the first order and whether international shipping applies. In an embodiment, one or more shipping attributes (e.g., a shipping service provider, shipping service program, etc.) may be predicted (e.g., as explained above with reference to FIGS. 1A-2) by the shipping management system 111, and the predicted shipping attributes may be presented to an entity overseeing the creation of the shipping label, which may include presenting the predicted shipping attributes to an operator of the seller/customer/shipper system 140 and/or an operator of a warehouse system 150, depending on where the shipment is originating from and the sophistication level of the seller (i.e., some smaller sellers may not operate warehouse systems 150). As explained above with reference to FIG. 1B, the predicted shipping attributes may be accepted, rejected, and/or modified using the controls 145.

Once the shipping attributes correctly identify the shipping service provider and/or third party service provider that are to be utilized in connection with the shipment of the first order, and the shipping service program, etc. have been confirmed, the shipping label may be created. In an embodiment, prior to or during creation of the shipping label, at block 740, the method 700 may include, at block 742, determining a unit of measure for the shipment, and, at block 744, determining whether the attributes of the order (e.g., weight, size, etc.) are in the unit of measure for the shipment. For example, when international shipping applies to a shipment originating in the United States, the units of measure for the shipment may be international units of measure (e.g., grams, kilograms, etc. for weight, millimeters, centimeters, meters, etc. for size, and the like), rather than standard units of measure (e.g., ounces, pounds, etc. for weight, inches, feet, yards, etc. for size, and the like). If the units of measure for the shipment, as indicated by the order attributes, are not in international units for an international shipment, then the method 700 may include, at block 746, converting the attributes of the order to the unit of measure for the shipment (e.g., convert any attributes specified in standard units to international units, or vice-versa, as may be necessary depending on the particular shipment). In an embodiment, once the attributes of the order are specified in the correct unit of measure, the shipping label may be created.

When international shipping applies to the shipment of the first order, the method 700 may include, at block 750, extracting customs information from the order information associated with the first order. The customs information may include information indicating the contents of the shipment as may be necessary to comply with government regulations regarding international shipment of items. At block 760, the method 700 may include prefilling one or more customs line items on the shipping label for the first item using the extracted customs information. In an embodiment, the customs information may be used to pre-fill customs information on the shipping label itself, and/or on any additional forms or documentation as may be required by governmental regulations, shipping carrier requirements, shipper requirements, and/or buyer requirements. By prefilling customs forms and documentation using information obtained from the order information, the process of shipping items internationally may be simplified, and errors in customs forms may be reduced, which may reduce or eliminate any potential delays that may occur due to errors in customs information.

Although not shown in FIG. 7, in an embodiment, the shipping management system 111 may further provide capabilities and functions for performing currency conversion in connection with purchases of postage for international shipments. For example, some shippers may have a headquarters located in a first country, but may originate shipments in multiple countries using country specific shipping carriers (e.g., USPS for shipments originating in the United States, Canada Post for shipments originating in Canada, etc.), and the country specific shipping carriers may sell postage in denominations specific to the national currencies of the respective countries (e.g., U.S. dollars for postage purchases from USPS, Canadian dollars for postage purchases from Canada Post, etc.). Thus, a company headquartered in the United States that does significant shipping in Canada may establish a warehouse facility or utilize a third party fulfillment house located in Canada for originating shipments of items to Canadian buyers using postage purchased from Canada Post while maintaining financial control over and funding of postage purchases using U.S. dollars. Further, by providing currency conversion utilities, such an entity may generate reports related to shipping costs or other metrics across multiple locations and countries that may illustrate shipping costs in a common unit of measure (e.g., U.S. dollars, or another currency as may be specified by the user).

Figure 8:
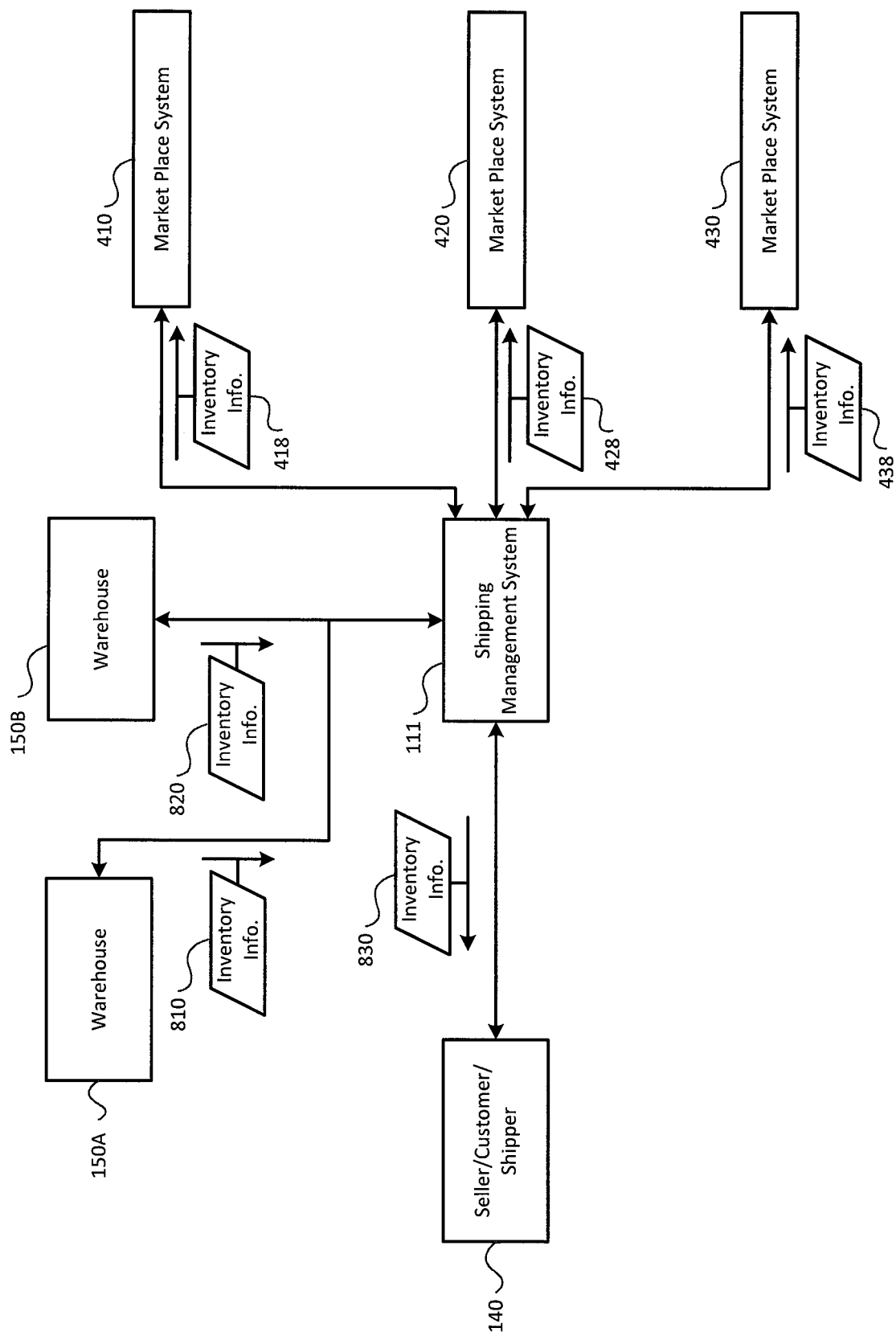
FIG. 8 is a block diagram illustrating a shipping management system configured to provide inventory management functionality according to embodiments of the invention.

Referring to FIG. 8, a block diagram illustrating a shipping management system configured to provide inventory management functionality according to embodiments of the invention is shown. In FIG. 8, the seller/customer/shipper system 140 is shown and may be operated by an entity that utilizes the local warehouse system 150A and a third party fulfillment house system 150B in connection with facilitating shipment of orders. It is noted that although FIG. 8 is described as a seller that operates a local warehouse and a third party fulfillment house, embodiments are not to be limited to such configurations. Rather, embodiments of the present invention may be applied to seller that operate using only third party fulfillment houses, only local warehouses, or that operate a single warehouse (of any size including the seller's home/garage or a traditional warehouse space) without utilizing any third party fulfillment houses.

As buyers place orders at the various market place systems 410, 420, 430, the shipping management system 111 may query (e.g., the queries 412, 422, 432 of FIG. 4) the market place systems 410, 420, 430 to obtain order information (e.g., the order information 414, 424, 434 of FIG. 4), which may be used to initiate shipment of items in connection with the orders, as described above. As items are shipped in connection with received orders, the seller's inventory may be reduced to reflect the quantities of particular items actually on hand. In an embodiment, the shipping management system 111 may periodically interrogate the warehouse systems 150 (e.g., the local warehouse system 150A and the third party fulfillment house 150B) to obtain updated inventory information regarding the on hand inventory of the seller (e.g., the operator of the seller/customer/shipper system 140). For example, the shipping management system 111 may query the local warehouse system 150A, and, in response to the query, may receive inventory information 810 indicating quantities of items offered for sale by the seller that are on-hand at the local warehouse associated with the local warehouse system 150A. Similarly, the shipping management system 111 may query the third party fulfillment house 150B, and, in response to the query, may receive inventory information 820 indicating quantities of items offered for sale by the seller that are on-hand at the third party fulfillment house associated with the third party fulfillment house 150B. In an embodiment, the shipping management system 111 may be configured to generate queries with respect to one or more items to obtain inventory information from respective warehouse systems regarding quantities of those one or more items on-hand at the respective warehouses. In an additional or alternative embodiment, the shipping management system 111 may be configured to generate global queries to obtain inventory information from the respective warehouse systems regarding quantities of all items on-hand at the respective warehouses.

In an embodiment, in response to receiving the inventory information (e.g., the inventory information 810, 820), the shipping management system 111 may update inventory information maintained in a database of or accessible to the shipping management system 111. Additionally, in response to receiving the inventory information (e.g., the inventory information 810, 820), the shipping management system 111 may provide information to the respective market place systems 410, 420, 430 regarding current inventory levels for items offered for sale by the seller are the respective market place systems 410, 420, 430. For example, the shipping management system 111 may transmit inventory information 418 to the first market place system 410, where the inventory information 418 identifies current on-hand inventory levels of items offered for sale by the seller via the first market place system 410. Similarly, the shipping management system 111 may transmit inventory information 428 and 438 to the second market place system 420 and the third market place system 430, respectively, where the inventory information 428 identifies current on-hand inventory levels of items offered for sale by the seller via the second market place system 420, and the inventory information 438 identifies current on-hand inventory levels of items offered for sale by the seller via the third market place system 430. Such information may be used by the respective market place systems to accurately indicate or reflect the quantities of items available for purchase from the seller. By providing the inventory information 418, 428, 438 to the respective market place systems 410, 420, 430, buyers are able to accurately determine the number of items that may be purchased from the seller via any one of the respective market place systems 410, 420, 430 using updated inventory levels. This may reduce or eliminate the likelihood that a buyer purchases a quantity of items from the seller, only to have the shipment delayed or partially delayed due to insufficient inventory levels, thereby making the system 100 of FIG. 1A more robust.

The inventory information obtained by the shipping management system 111 may further be used in connection with the creation of shipping labels. For example, when the seller (or an entity operating a warehouse on behalf of the seller) attempts to create a shipping label for an order using any or all of the various techniques described above, the shipping management system 111 may determine whether the seller has enough inventory on-hand to satisfy the order. This may include determining whether a single location (e.g., a single warehouse location) has sufficient quantities of the item(s) of the order on-hand to fulfill the order. If a single location having sufficient quantities of the item(s) is not found, the shipping management system 111 may determine whether a combination of various locations has sufficient quantities of the item(s) on-hand to fulfill the order. In an embodiment, if multiple locations, in combination, are determined to have sufficient quantities on-hand, the shipping management system 111 may predict multiple shipping attributes for shipment of the order (e.g., shipping attributes for shipping a portion of the order from each of the multiple locations). In an additional or alternative embodiment, the shipping management system 111 may provide an indication to the entity requesting shipment that indicates the multiple locations, and provides controls for allowing the entity to authorize shipment of the order from the multiple locations, or to request that item(s) of the order be consolidated to a particular location to facilitate a single shipment of the entire order. In an embodiment, the shipping management system 111 may be configured to update inventory levels of the item(s) of the order to reserve particular quantities of the item at a particular location, such that those item(s) are not shipped in connection with other orders, so that the reserved items, in conjunction with the remaining item(s) received from other locations for consolidation purposes, may be on-hand and shipped immediately upon receipt of the relocated item(s). If the shipping management system 111 determines that insufficient quantities of an item(s) are on-hand to fulfill an order, the shipping management system 111 may provide an error message to the system of the entity requesting creation of a shipping label, where the error message indicates that the shipping label cannot be created due to insufficient on-hand quantities of the item(s) of the order. This may prevent shipping labels and other shipping documentation from being created for orders that are not capable of being shipped due to insufficient inventory with respect to the item(s) of the order.

In an embodiment, the shipping management system 111 may include an interface (e.g., a hardware interface, an API interface, another type of software interface, or a combination of hardware/API/software interfaces) to facilitate distribution of notifications in connection with shipment of orders. For example, in an embodiment where a seller utilizes a warehouse (e.g., a local warehouse and/or remote or third party fulfillment houses), the warehouse system(s) may be configured to provide a notification feature, which may utilize the interface provided by the shipping management system 111 to provide notifications relevant to the shipment of orders. For example, shipping carriers may arrive at the warehouse facility at various scheduled or unscheduled times to pick up shipments. When a particular shipping carrier arrives to pick up shipments that are being shipped using the particular shipping carrier, the notification feature may be utilized to transmit a notification to various devices of the warehouse system to indicate that the particular shipping carrier has arrived and that all shipments for that particular carrier need to be delivered to a particular location of the warehouse, such as a loading dock. The shipping management system 111 may be configured to receive the notification via the interface and to distribute the notification (e.g., via e-mail messages, text messages, instant messaging system messages, automated voice response messages, etc.) to various devices operating within the relevant warehouse system (e.g., systems of the warehouse where the shipping carrier is located for shipment pick up) to notify to users of the various devices that the particular shipping carrier is picking up shipments. By facilitating the notification feature, the shipping management system 111 may help ensure that shipments enter the mail stream (i.e., are picked up by the particular shipping carrier) in a timely fashion.

By monitoring inventory information, as described above, the shipping management system 111 provides a robust multi-channel/multi-carrier shipping management system for facilitating on-time shipment of orders. For example, by determining locations where items of an order are on-hand in sufficient quantities to fulfill the order, whether through a single shipment or through multiple shipments from two or more locations, orders may be shipped more rapidly. Further, by updating market place systems to accurately reflect on-hand quantities of items to potential buyers, buyer satisfaction may be increased (e.g., because the buyer knows there is sufficient quantities of an ordered item at the time the order is placed). Additionally, by providing the notification feature, personnel responsible for preparing orders for shipment may be notified when a particular shipping carrier is available to pick up shipments, and may be able to provide those shipments to the shipping carrier in a more timely fashion. This may further increase the likelihood that shipments arrive at destinations on-time and in a manner that satisfies any shipping QoS requirements imposed by a buyer.

Figure 9:
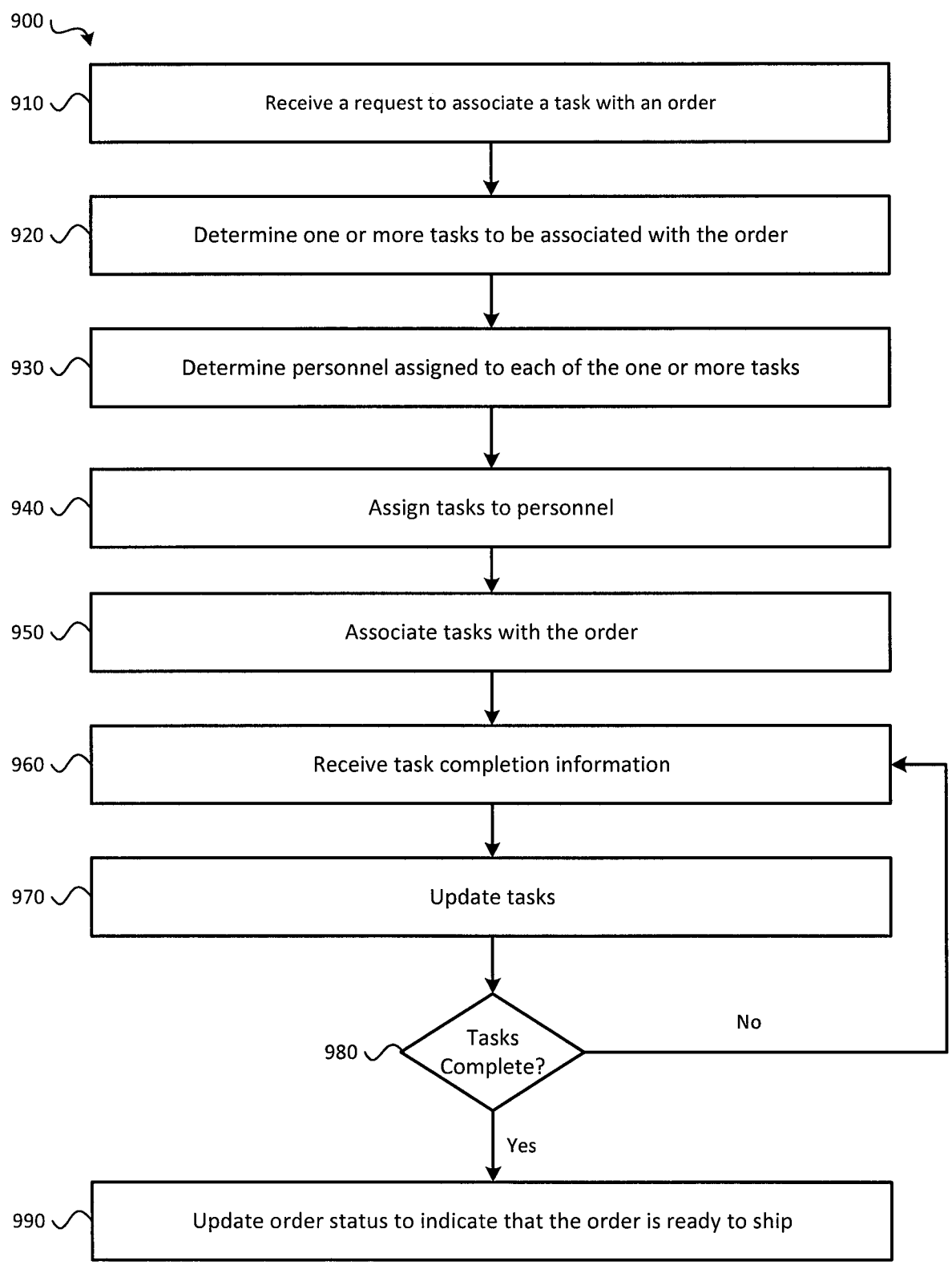
FIG. 9 is a flow diagram of a method of assigning tasks to orders according to embodiments of the invention.

Referring to FIG. 9, a flow diagram of a method of assigning tasks to orders according to embodiments of the invention is shown as a method 900. In an embodiment, the method 900 may be performed by the shipping management system 111. In an additional or alternative embodiment, the method 900 may be performed by the seller/customer/shipper system 140. In yet another additional or alternative embodiment, the method 900 may be performed by a warehouse system. In still another additional or alternative embodiment, the method 900 may be performed using a combination of systems selected from the list comprising: the shipping management system 111, the seller/customer/shipper system 140, and warehouse systems.

At block 910, a request to associate a task with an order may be received. The request may include information identifying a particular order (e.g., using the order ID 131A of FIG. 1B), and may include information identifying a particular task to be performed, and information indicating who is to perform the task. At block 920, the method 900 includes determining one or more tasks to be associated with the order, and, at block 930, determining personnel assigned to each of the one or more tasks. For example, an order (e.g., the order 131 of FIG. 1) may be received, and may include information indicating that a buyer has purchased one or more items. In order to fulfill the order a plurality of tasks may be required, such as pulling the one or more items from on-hand inventory, obtaining any required shipping materials (e.g., envelopes, padded envelopes, containers, crates, boxes, packing materials, etc.) for housing the one or more items during shipment, placing the one or more items into a container, creating a shipping label for the shipment of the order, and providing the shipment to a shipping carrier. Each of these tasks may be assigned to one or more persons who are responsible for performing the assigned tasks in connection with shipment of the order.

At block 940, the tasks may be assigned to the respective personnel identified at block 930, and, at block 950, the tasks and assigned personnel may be associated with the order. At block 960, the method 900 may include receiving task completion information, and, at block 970, the method 900 may include updating the tasks associated with the order. For example, the personnel assigned to pull the one or more items of the order from on-hand inventory may complete the assigned task, and may provide an input indicating that the task has been completed. In response to receiving the input, the task associated with the order may be updated to indicate that the task has been completed. In an embodiment, upon receiving the input indicating that the task has been completed, a notification may be provided (e.g., using one or more of the notification techniques described with reference to FIG. 8) to the personnel assigned to the next uncompleted task.

The method 900 may include, at block 980, determining whether all tasks associated with the order have been completed. If all tasks have not been completed, the method 900 may proceed to block 960, and wait for additional inputs related to the completion of any remaining tasks associated with the order. If all tasks have been completed, the method 900 may include, at 990, updating the order status to indicate that the order is ready to ship.

In an embodiment, the shipping management system 111 (or another system configured according to embodiments) may be configured to push notifications regarding assigned tasks and/or tasks status to various devices operating within the system 100. For example, a notification may be provided to a mobile device associated with personnel assigned a particular task. In an embodiment, the notification may be pushed to the mobile device and may be viewed from an application executing on the mobile device. In another embodiment, the notification may be provided to the personnel via a web portal interface provided by a web page interfacing with the shipping management system 111, such as via a pop-up message or other technique. Further, completion of some tasks may trigger additional actions by the shipping management system 111. For example, in response to receiving an input indicating that the task of pulling one or more items from on-hand inventory has been completed, the shipping management system 111 of embodiments may update inventory information to reduce the on-hand quantities to reflect that the one or more items have been pulled from on-hand inventory. It is noted that by assigning personnel to tasks such as pulling inventory in connection with preparation of orders for shipment, discrepancies between inventory on-hand, as indicated by various inventory systems, and actual inventory on-hand may be more easily traced to identify the cause of the discrepancies. Further, it is noted that although described in connection with assigning tasks to outbound shipments in connection with orders, tasks may further be assigned to inbound orders as well. For example, when a seller orders items from a supplier, such as to replenish inventory levels, personnel and tasks may be assigned to receipt of the order from the supplier, such as to verify the correctness of the order upon receipt (e.g., all ordered items were received), re-stock inventory upon verification of the received order, etc. Additionally, embodiments may further be utilized to assign tasks such as creating orders to suppliers. For example, rules may be configured in the shipping management system 111 to associate the task of ordering one or more items in response to detecting that on-hand inventory for the one or more items falls below a threshold. In an embodiment, such tasks may be assigned to a buyer or other personnel responsible for placing such orders, and, upon detecting inventory levels for an item have fallen below a threshold, an order for the one or more items may be created and sent to the assigned personnel for authorization to place the order. In additional or alternative embodiments, the rules may be configured to automatically place such orders from suppliers without requiring approval of personnel. Thus, embodiments of the present invention provide a robust technique for managing tasks in connection with offering items for sale via market place systems, managing tasks in connection with shipment of items ordered via the market place systems, and managing tasks associate with maintaining inventory of items offered for sale via the market place systems.

Figure 10:
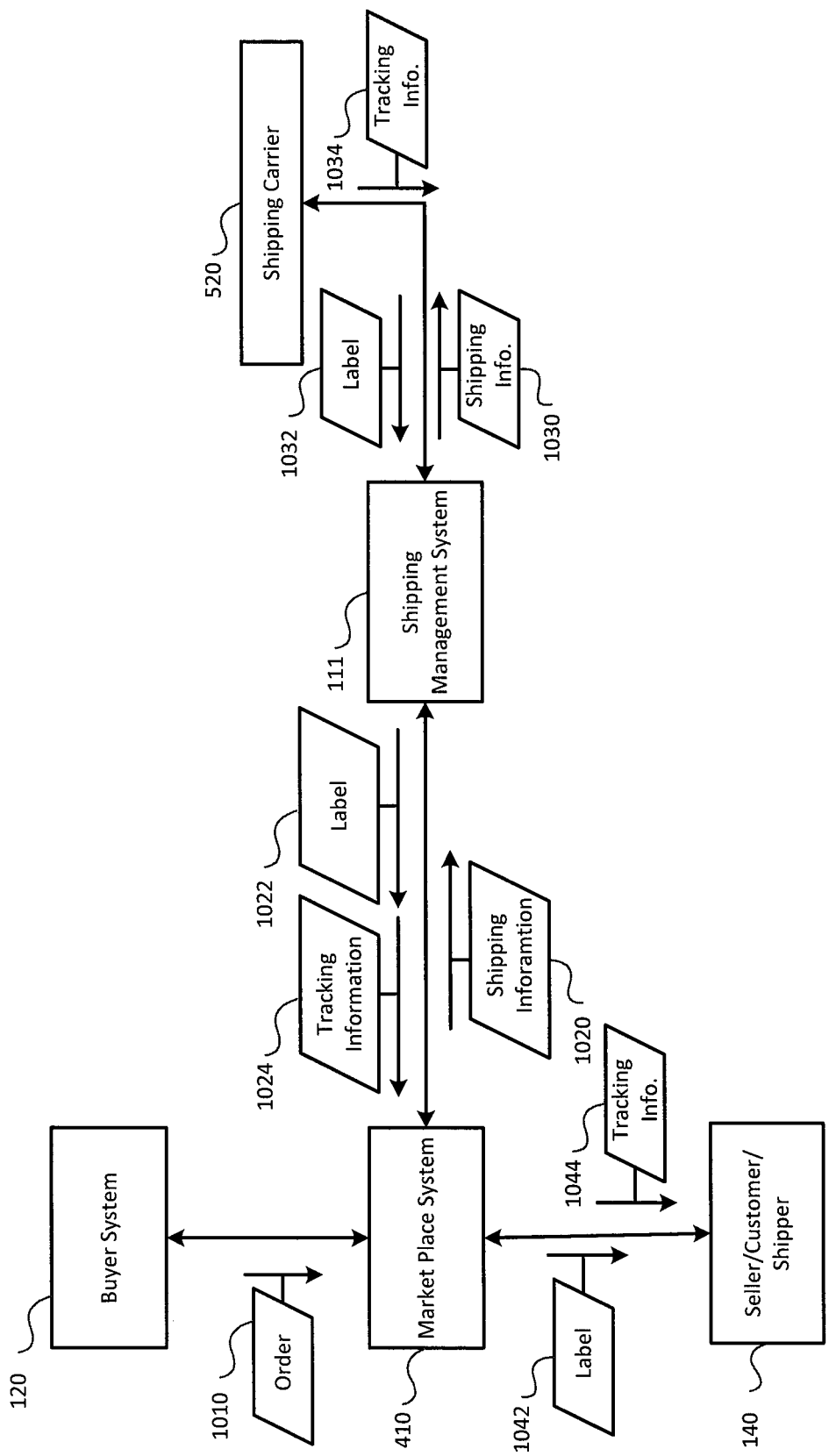
FIG. 10 is a block diagram illustrating aspects providing multi-carrier functionality to a market place system via a shipping management system according to embodiments of the invention.

Referring to FIG. 10, a block diagram illustrating aspects providing multi-carrier functionality to a market place system via a shipping management system according to embodiments of the invention. In FIG. 10, the buyer system 120, the shipping management system 111, and the seller/customer/shipper system 140 of FIG. 1, the first market place system 410 of FIG. 4, and the second shipping service provider system 520 of FIG. 5 are shown. As described in more detail below, the shipping management system 111 may provide market place systems, such as the first market place system 410, with the ability to utilize the multi-carrier functionality of the shipping management system 111 to provide services to small sellers (e.g., sellers that may not sell enough items to support the costs of using the shipping management system 111). Additionally, the functionality of the shipping management system 111 described in connection with FIG. 10 may further be used by market place systems to provide value-added services to their respective seller-customers (e.g., sellers that utilize the market place systems to sell items) in order to gain a competitive edge over other market place systems that do not provide such services.

During operation, a buyer may use the buyer system 120 to interact with the first market place system 410 to place an order 1010. In an embodiment, the order 1010 may include information similar to the information described in connection with FIGS. 1A and 1B with respect to the order 131. The seller (e.g., operator of the seller/customer/shipper system 140) may use a web browser to interact with the first market place system 410 and to learn of the order 1010. During interaction with the first market place system 410, the seller may configure shipping of the order 1010. In an embodiment, the market place system 410 may communicate with the shipping management system 111 to obtain one or more shipping attribute predictions for configuring the shipment of the order 1010, and may present the seller with an interface (e.g., the user interface 141 of FIG. 1B) to allow the seller to configure the shipment of the order 1010. As described in connection with FIG. 1B, the seller may accept/reject/modify the predicted shipping attributes, and, once the seller is satisfied that the shipping attributes are correct, may initiate creation of a shipping label (and other documentation as may be relevant to the order 1010) using the interface provided by the interface provided by the first market place system 410 via the web browser.

In response to receiving the request to create a shipping label for the order 1010, the first market place system 410 may generate and transmit shipping information 1020 to the shipping management system 111. In an embodiment, the shipping information 1020 may include all or a portion of the information described in connection with the shipping information 512, 522, 532, 542 of FIG. 5, and/or any of the shipping attributes 143 and order attributes 131A-131I of FIG. 1B. The shipping management system 111 may receive the shipping information 1020 from the first market place system 410, and may generate a request 1030 to generate shipping information (e.g., a shipping label, tracking information, etc.) to a shipping service provider (e.g., a shipping carrier such as UPS, FedEx, etc.) system, such as the second shipping service provider system 520, as shown in FIG. 10. The second shipping service provider system 520, in response to receiving the request 1030, may generate a shipping label 1032 and tracking information 1034 for the shipment of the order 1010, and may transmit the shipping label 1032 and the tracking information 1034 to the shipping management system 111, which may in turn provide the shipping label and tracking information to the first market place system 410 as a shipping label 1022 and tracking information 1024. As explained above, in an embodiment, the shipping management system 111 may provide conversion of information from a format native to the second shipping service provider to a format native to the first market place system 410. In an embodiment, the shipping labels 1022, 1032 may include postage indicia data that may be used to generate postage indicia. In an additional or alternative embodiment, the shipping label 1032 may include postage indicia data, and the shipping label 1022 may include postage indicia, such as when the shipping management system 111 generates the postage indicia using the postage indicia data included in the shipping label 1032. In another additional or alternative embodiment, the shipping labels 1022, 1032 may include postage indicia data, and the shipping label 1022 may include postage indicia data, such as when the market place system 130 generates the postage indicia using the postage indicia data included in the shipping labels 1022, 1032.

Upon receiving the shipping label 1022 and the tracking information 1024, the information may be provided to the seller via the web page interface as label information 1042 and tracking information 1044. The seller may then utilize a peripheral device to print the shipping label 1042 for use in shipping one or more items of the order 1010 to the buyer. In an embodiment, the shipping label 1042 may include postage indicia data that may be used by the seller/customer/shipper system 140 to generate postage indicia. In an additional or alternative embodiment, the shipping label 1042 may include postage indicia, such as when the shipping management system 111 or the market place system 103 generates the postage indicia using the postage indicia data included in the shipping label 1032. Using the embodiment described with reference to FIG. 10 may allow small sellers the ability to utilize all or some of the functionality of the shipping management system 111 indirectly (e.g., via market place systems that provide such functionality as an added-value service).

It is noted that embodiments of the shipping management system 111 are not limited in application to the particular uses or environments illustrated in FIGS. 1A-10. Further, it is noted that any of the functionalities described in connection with the shipping management system 111 of embodiments may be provided via an application programming interface (API) that enables any and all of the features and functions performed by the shipping management system 111 to be integrated with and performed at any other system (e.g., a seller/customer/shipper system, a warehouse system, a market place system, a shipping service provider system, a third party services system, and the like). By enabling the functionality and operations provided by the shipping management system 111 to be accessed via an API, the external systems may more easily be configured to provide multi-channel/multi-carrier functionality to their respective users (e.g., using function calls to the API of the shipping management system 111) without requiring configuration of such external systems for communication with a plurality of market place systems, a plurality of shipping carrier systems, a plurality of third party services systems, a plurality of warehouse systems, and the like, and which could pose significant challenges to operators of many of such external systems.

Figure 11:
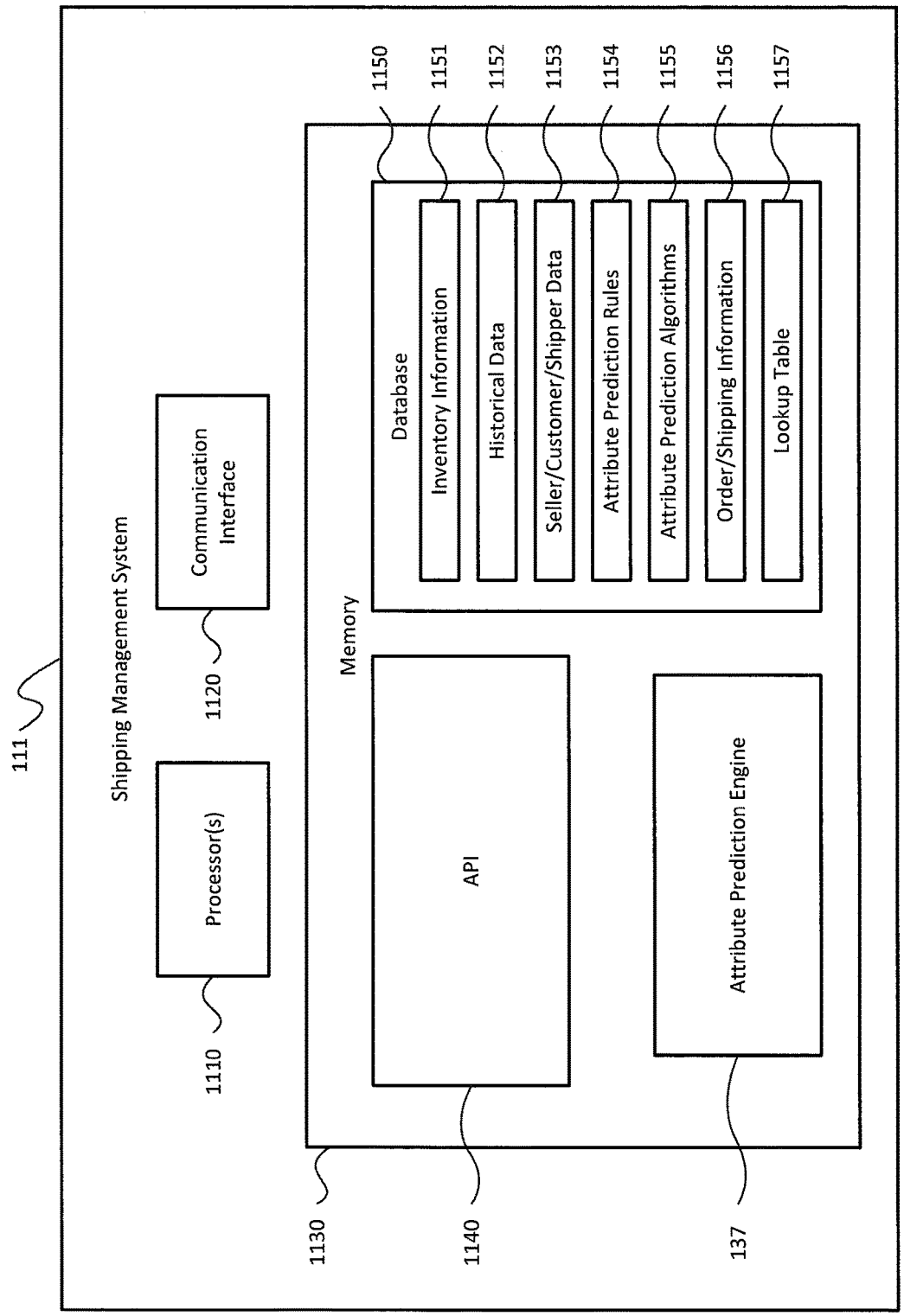
FIG. 11 is a block diagram illustrating an exemplary configuration of a multi-carrier/multi-channel shipping management system configured to provide integration of functionality of the shipping management system with external systems according to embodiments of the invention.

Referring to FIG. 11, a block diagram illustrating an exemplary configuration of a multi-carrier/multi-channel shipping management system configured to provide integration of functionality of the shipping management system with external systems according to embodiments of the invention is shown. As shown in FIG. 11, the shipping management system 111 may include a processor 1110, a communication interface 1120, a memory 1130, and the attribute prediction engine 137 of FIG. 1. In an embodiment, the processor 1110 may include one or more processors, and each of the one or more processors may include one or more processing cores. The communication interface 1120 may be configured to communicatively couple the shipping management system 111 to one or more networks, such as the network 110 of FIG. 1 via wired or wireless communication links established according to one or more communication protocols or standards (e.g., an Ethernet protocol, a transmission control protocol/internet protocol (TCP/IP), an institute of electrical and electronics engineers (IEEE) 802.11 protocol, an IEEE 802.16 protocol, a $3^{rd}$ generation (3G) protocol, a $4^{th}$ generation (4G)/long term evolution (LTE) protocol, etc.).

The memory 1130 may include read only memory (ROM) devices, random access memory (RAM) devices, one or more hard disk drives (HDDs), flash memory devices, solid state drives (SSDs), other memory devices configured to store data in a persistent or non-persistent state, or a combination of different memory devices. In an embodiment, the memory 1130 may store instructions (not shown in FIG. 11) that, when executed by the processor 1110, cause the processor 1110 to perform the operations described in connection with the shipping management system 111 with reference to FIGS. 1-10. In an embodiment, the instructions may include instructions that, when executed by the processor 1110, cause the processor 1110 to perform the operations of the attribute prediction engine 137.

The memory 1130 may also provide a database 1150 configured to store various data used by the shipping management system 111 to provide various functionalities to external systems, such as the market place systems 130, 410, 420, 430 of FIGS. 1, 4, 6, 8, and 10, respectively, the warehouse/third party fulfillment house systems 150A and 150B of FIGS. 1 and 8, the seller/customer/shipper system 140, the shipping carrier systems 160B, 510, 520 of FIGS. 1, 5, and 10, respectively, and the third party service provider systems 160A, 530 of FIGS. 1 and 5, respectively. For example, the database 1150 may store inventory information 1151 (e.g., the inventory information described with reference to FIG. 8) that may be utilized to provide various functionality relating to inventory management, as described with reference to FIG. 8. The database 1150 may also store historical data 1152 that may be used by the attribute prediction engine 137 to predict attributes in connection with orders, as described with reference to FIGS. 1A-2. In an embodiment, the historical data 1152 may be the historical data 115 of FIG. 1.

Additionally, the database 1150 may store seller/customer/shipper data 1153, attribute prediction rules 1154, attribute prediction algorithms 1155, and order/shipping information 1156. The seller/customer/shipper data 1153 may include information associated with various operators of seller/customer/shipper systems that utilize (e.g., via a web page provided by the operator of the shipping management system 111 or via an API provided by the shipping management system 111, as described below) the functionality provided by the shipping management system 111. For example, the seller/customer/shipper data 1153 may include information identifying market place systems where a seller offers items for sale, credential information associated with the seller's accounts with one or more of the market place systems (e.g., information that may be used by the shipping management system 111 to retrieve order information associated with items offered for sale by the seller from the market place systems), information indicating locations where the seller may originate shipments, a unit of measure preference (e.g., international units or measure or standard units of measure), a currency preference, information associated with shipping carriers and third party service providers that the seller utilizes in connection with preparing shipments, credential information associated with the seller's accounts with one or more of the shipping carrier systems and/or third party service providers (e.g., information that may be used by the shipping management system 111 to generate shipping labels and other shipping documentation, purchase postage indicia/postage indicia data, purchase insurance, etc. using the shipping carrier systems and third party service providers on behalf of the seller), and other information that may be utilized by the shipping management system 111 in providing the various multi-carrier/multi-channel functionality described herein. The attribute prediction rules 1154 and attribute prediction algorithms 1155 may be used by the attribute prediction engine 137 to select prediction rules and predict attributes in connection with configuring shipments, as described above with reference to FIGS. 1A-2. The order/shipping information 1156 may include order information (e.g., the order information 414, 424, 434 of FIG. 4) associated with orders retrieved from various market place systems, and may include shipping information (e.g., the label information 514, 524, 534 and tracking information 516, 526, 536 of FIGS. 5 and 6).

In an embodiment, the database 1150 may further include a lookup table 1157. The lookup table 1157 may be utilized to provide various features and functionalities provided by the shipping management system 111 of embodiments. For example, the lookup table 1157 may include information that may be used to map commands received (e.g., from the seller/customer/shipper system 140 or a market place system) in a format native to the shipping management system 111 to a format native to an external system (e.g., a shipping carrier system, a third party service provider system, a market place system, etc.), such as to facilitate retrieval of the order information from respective ones of the market place systems, etc. Additionally, the lookup table 1157 may include information that facilitates various international functionalities, such as currency and unit of measure conversions, as described above with reference to FIG. 7.

In an embodiment, the database 1150 may be stored external to the shipping management system 111, such as at a network attached storage device, a storage area network (SAN), or other external database system that may be accessible to the shipping management system 111 via a network (e.g., the network 110 of FIG. 1 or other networks). Further, it is noted that although the database 1150 is shown as a single database, the database 1150 may be a distributed database provided by a plurality of devices (e.g., database servers, shipping management system servers, or other devices), such as to provide fault tolerance, load balancing, data/disaster recovery, and other various features.

As shown in FIG. 11, the memory 1130 may further store instructions for providing an application programming interface (API) 1140 configured to provide integration of multi-carrier/multichannel functionality of the shipping management system with external systems, such as the market place systems 130, 410, 420, 430 of FIGS. 1, 4, 6, 8, and 10, respectively, the seller/customer/shipper system 140, the shipping carrier systems 160B, 510, 520 of FIGS. 1, 5, and 10, respectively, and the third party service provider systems 160A, 530 of FIGS. 1 and 5, respectively. In an embodiment, the API 1140 may provide a suite of function calls that may be used by the external systems to integrate various functionality (e.g., the operations described above with respect to FIGS. 1-10, and other functionality described briefly below) provided by the shipping management system 111 into sub-systems of the external systems.

For example, the seller/customer/shipper system 140 may include an accounting sub-system, and the API 1140 may be used to integrate the accounting sub-system with the shipping management system 111, such as to import the order/shipping information 1156 from the database 1150 into the accounting sub-system. Other exemplary functionalities that may be provided by the API 1140 may include: (1) importing of the order/shipping information 1156 from the shipping management system 111 to external systems; (2) extracting or retrieving the inventory information 1151 from external systems by the shipping management system 111, and distribution of the inventory information 1151 to external systems; (3) creation of shipping labels, postage indicia and/or indicia data, pre-filling customs forms, and other shipping documentation functionality from external systems; (4) mobile device support; (5) exporting data (e.g., shipping or tracking information, etc.) to external systems; (5) provide asynchronous support/presentation/provisioning/retrieval of information to and from external systems; (6) regulation of throttling restrictions; (7) caching layer and horizontal scaling support, which may include (7A) dynamic management and assignment of external systems to one of a plurality of user environments via a single point of entry to the shipping management system (e.g., seller/customer/shipper system data can be moved from one of a plurality of servers/databases to another server/database dynamically without requiring modification of how the seller/customer/shipper system accesses the API), (7B) static management and assignment of external systems to one of the plurality of user environments via assignment of one of a plurality of points of entry to the shipping management system 111 (e.g., seller/customer/shipper system data can be moved from one of a plurality of servers/databases to another server/database dynamically but requires modification to an API URL used by the seller/customer/shipper system to accesses the API), or (7C) a combination of dynamic and static access techniques for managing user environments and access; (8) support designation of flat rate or percentage markups on shipping rates by the seller, dynamic retrieval of current rate information from shipping carrier systems and/or third party service provider systems, and pushing marked shipping rate information to market place systems; (9) ability to add/integrate additional market place systems, shipping carrier systems, third party service provider systems, etc. by providing information identifying such system(s) in connection with an add service; (10) support for this party billing in connection with shipments; (11) time zone calculation/conversion in connection with scheduling delivery/pickup or shipments, etc.; (12) unit of measure conversion; (13) inventory management functionality; (14) assignment of tasks and personnel to various orders/shipments; (15) prediction of order and shipping attributes; (16) postage account locking/gatekeeping functionality; (17) refresh store functionality to refresh information of a seller at one or more market place systems or information from the one or more market place systems at the seller/customer/shipper system 140; or (18) a combination of the above-described functionalities and operations.

By providing the API 1140, users of the shipping management system 111 may more tightly integrate their internal systems with the shipping management system, which may allow for automation of many tasks associated with management of shipping orders and other aspects of operating a business involved in shipment of item. For example, the API 1140 may be used to automate importation of order and sales information into an accounting system, automation of shipping label and shipping documentation (e.g., customs forms, packing slips, etc.) in connection with shipments, intelligent configuration of shipments using predicted shipping attributes with user intervention techniques, automatic propagation of shipping information to market place systems, and other features/integrations that improve the operations of the shipping management system 111 and/or any external systems that are integrated with the shipping management system 111 using the API. Further, it is noted that although described as providing various functionality via the API, for external system users that do not wish to integrate, or are not able to integrate with the shipping management system 111, the shipping management system 111 may further provide a web page, web portal, stand-alone application or other application/technique that may allow the users of the external systems to access at least a portion of the functionality provided by the shipping management system 111 (e.g., all functionality except importing data from the shipping management system 111).

Further, it is noted that the API 1140 may include standard function calls and advance function calls for at least a portion of the above-described functionality and operations. For example, standard function calls may include the most common parameters for a particular function, such as providing size, weight, shipping service program and carrier information, and origin/destination information for a create shipping label function call, and advance options may be provided that enable additional information (e.g., whether the shipment contains alcohol or other substances/materials that may be subject to regulatory shipping requirements, etc.) to be provided in the create shipping label function call should such options be required for particular shippers/sellers, or even particular shipments. Thus, the API 1140 of embodiments may provide a robust and diverse number of features for integrating the multi-carrier/multi-channel/multi-national functionalities provided by the shipping management system 111 of embodiments described with reference to FIGS. 1-11.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for determining a shipping attribute, the method comprising:
receiving, by a processor, a set of historical data corresponding to shipment of a plurality of orders, wherein the set of historical data comprises information associated with order attributes and shipping attributes for the shipment of the plurality of orders;
constructing, by the processor, a set of one or more prediction rules based on the set of historical data, wherein each prediction rule of the set of one or more prediction rules comprises a condition corresponding to a predetermined outcome associated with a shipping attribute value, and wherein the set of one or more prediction rules is configured to predict particular shipping attributes values for shipping a particular order when particular order attributes of the particular order satisfy particular conditions corresponding to particular predetermined outcomes associated with the particular shipping attributes values;
receiving, by the processor, an order from a third party marketplace, wherein the order comprises known values for a set of order attributes;
executing, by the processor, the set of one or more prediction rules against the known values of the set of order attributes to predict one or more shipping attribute values for shipping the order, wherein each of the predicted one or more shipping attribute values is associated with a predetermined outcome corresponding to a condition that is satisfied by the set of order attributes;
locking, by the processor, access to a postage account for the order;
determining, by the processor, whether a balance of the postage account is sufficient for generation of a postage indicium for the order during the locking;
unlocking, by the processor, access to the postage account after the determining; and
generating a shipping label for shipping the order based at least in part on the predicted one or more shipping attribute values when the postage account balance is determined sufficient for generation of the postage indicium for the order.

2. The method of claim 1, wherein the predicted one or more shipping attribute values are associated with shipping attributes selected from a set of shipping attributes comprising: shipping service provider information, shipping service program information, package type, insurance, return label, non-machinable, confirmation level, postage, the postage account balance, and warehouse locations.

3. The method of claim 1, wherein the set of one or more prediction rules are configured to predict a value for a shipping attribute corresponding to a shipping service program selected from a set of shipping service programs comprising: FedEx ground, FedEx overnight, FedEx express, USPS standard, USPS first class mail, USPS priority, USPS express, and UPS.

4. The method of claim 1, wherein the set of historical data is based on shipment of orders received within a certain period of time, or a volume of orders.

5. The method of claim 1, wherein an algorithm used for the constructing the set of one or more prediction rules is selected based on a time of a shipping service or seasonality of a shipping service.

6. The method of claim 1, wherein an algorithm used for the constructing the set of one or more prediction rules is related to a maximum entropy algorithm or a neural network algorithm.

7. The method of claim 1, wherein a particular rule of the set of one or more prediction rules is constructed based on manual input.

8. The method of claim 1, further comprising:
checking a certainty of the predicted one or more shipping attribute values;
presenting, on an user interface, the predicted one or more shipping attribute values when the certainty of the predicted one or more shipping attribute values is equal or higher than a prediction threshold; and
detecting, by the processor, whether there is a changed value received for at least one of the predicated one or more shipping attribute values, wherein the changed value overrides the at least one of the predicted one or more shipping attribute values.

9. The method of claim 8, further comprising:
accepting the changed value for the at least one of the predicted one or more shipping attribute values when the changed value is received;
revising the historical data by adding the changed value and the order into the set of historical data to produce a revised set of historical data; and
updating the set of one or more prediction rules based on the revised set of historical data that includes the changed value and the order.

10. The method of claim 8, further comprising:
revising the historical data by adding the predicted one or more shipping attribute values and the order into the set of historical data when the certainty of the predicted one or more shipping attribute values is below the prediction threshold to produce a revised set of historical data; and
updating the set of one or more prediction rules based on the revised set of historical data that includes the predicted one or more shipping attribute values and the order.

11. The method of claim 8, wherein the certainty of the predicted one or more shipping attribute values is calculated by counting a percentage of correct predictions among past predictions generated by the set of one or more prediction rules.

12. The method of claim 1, further comprising:
constructing a second set of one or more prediction rules configured to predict shipping attributes for shipping one or more orders based on the set of historical data;
receiving, by the processor, a second order, wherein the second order comprises known values for a second set of order attributes of the second order;
selecting the set of one or more prediction rules or the second set of one or more prediction rules as a selected set of prediction rules for predicting shipping attributes of the second order; and
executing the selected set of one or more prediction rules against the known values of the second set of order attributes of the second order to predict shipping attribute values for shipping the second order.

13. The method of claim 12, wherein the selecting of the set of one or more prediction rules or the second set of one or more prediction rules as the selected set of prediction rules is based on a set of criteria, and wherein different criterion of the set of criteria, when selected, are configured to predict a different set of one or more shipping attributes for a same order.

14. The method of claim 1, wherein the generation of the postage indicium for the order occurs independent of whether access to the postage account is locked in connection with a determination of whether the balance of the postage account is sufficient for generation of a second postage indicium for a second order.

15. The method of claim 1, further comprising, after the postage indicium for the order is generated, locking the postage account balance and determining whether the postage account balance exceeds a threshold postage account balance, wherein operations to add value to the postage account balance are initiated when the postage account balance does not exceed the threshold postage account balance, and wherein the postage account is unlocked when the postage account balance exceeds a threshold postage account balance or when the value is added to the postage account balance.

16. A method for determining a shipping attribute, the method comprising:
receiving, by a processor, a set of historical data corresponding to shipment of a plurality of orders, wherein the set of historical data comprises information associated with order attributes and shipping attributes for the shipment of the plurality of orders;
constructing, by the processor, a set of one or more prediction rules based on the set of historical data, wherein each prediction rule of the set of one or more prediction rules comprises a condition corresponding to a predetermined outcome associated with a shipping attribute value, and wherein the set of one or more prediction rules is configured to predict particular shipping attributes values for shipping a particular order when particular order attributes of the particular order satisfy particular conditions corresponding to particular predetermined outcomes associated with the particular shipping attributes values;
receiving, by the processor, an order from a third party marketplace, wherein the order comprises known values for a set of order attributes;
executing, by the processor, the set of one or more prediction rules against the known values of the set of order attributes to predict one or more shipping attribute values for shipping the order, wherein each of the predicted one or more shipping attribute values is associated with a predetermined outcome corresponding to a condition that is satisfied by the set of order attributes;
checking, by the processor, a certainty of the predicted one or more shipping attribute values; and
presenting, on an user interface, the predicted one or more shipping attribute values for shipping the order when the certainty of the predicted one or more shipping attribute values for shipping the order is equal or higher than a prediction threshold;
locking, by the processor, access to a postage account for the order;
determining, by the processor, whether a balance of the postage account is sufficient for generation of a postage indicium for the order during the locking;
unlocking, by the processor, access to the postage account after the determining; and
generating a shipping label for shipping the order based at least in part on the predicted one or more shipping attribute values when the postage account balance is determined sufficient for generation of the postage indicium for the order.

17. The method of claim 16, further comprising:
    detecting, by the processor, whether there is a changed value received for at least one of the predicated one or more shipping attribute values, wherein the changed value overrides the at least one of the predicted one or more shipping attribute values;
    accepting the changed value for the at least one of the predicted one or more shipping attribute values when the changed value is received; and
    updating the set of one or more prediction rules based on the changed value and the set of historical data.

18. The method of claim 16, further comprising:
    updating the set of one or more prediction rules based on the predicted one or more shipping attribute values when the certainty of the predicted one or more shipping attribute values is below the prediction threshold.

19. The method of claim 16, wherein the set of historical data is based on shipment of orders received within a certain period of time, or a volume of orders.

20. The method of claim 16, wherein an algorithm used for the constructing the set of one or more prediction rules is selected based on a time of a shipping service or seasonality of a shipping service.

21. The method of claim 16, wherein an algorithm used for the constructing the set of one or more prediction rules is related to a maximum entropy algorithm or a neural network algorithm.

22. The method of claim 16, wherein the generation of the postage indicium for the order occurs independent of whether access to the postage account is locked in connection with a determination of whether the balance of the postage account is sufficient for generation of a second postage indicium for a second order.

23. The method of claim 16, further comprising, after the postage indicium for the order is generated, locking the postage account balance and determining whether the postage account balance exceeds a threshold postage account balance, wherein operations to add value to the postage account balance are initiated when the postage account balance does not exceed the threshold postage account balance, and wherein the postage account is unlocked when the postage account balance exceeds a threshold postage account balance or when the value is added to the postage account balance.

24. A non-transitory computer-readable medium storing instructions that, when executed by a processor, cause the processor to perform operations to:
    receive a set of historical data corresponding to shipment of a plurality of orders, wherein the set of historical data comprises information associated with order attributes and shipping attributes for the shipment of the plurality of orders;
    construct a set of one or more prediction rules based on the set of historical data, wherein each prediction rule of the set of one or more prediction rules comprises a condition corresponding to a predetermined outcome associated with a shipping attribute value, and wherein the set of one or more prediction rules is configured to predict particular shipping attributes values for shipping a particular order when particular order attributes of the particular order satisfy particular conditions corresponding to particular predetermined outcomes associated with the particular shipping attributes values;
    receive an order from a third party marketplace, wherein the order comprises known values for a set of order attributes;
    execute the set of one or more prediction rules against the known values of the set of order attributes to predict one or more shipping attribute values for shipping the order, wherein each of the predicted one or more shipping attribute values is associated with a predetermined outcome corresponding to a condition that is satisfied by the set of order attributes;
    lock, by the processor, access to a postage account for the order;
    determine, by the processor, whether a balance of the postage account is sufficient for generation of a postage indicium for the order during the locking;
    unlock, by the processor, access to the postage account after the determining; and
    generate a shipping label for shipping the order based at least in part on the predicted one or more shipping attribute values when the postage account balance is determined sufficient for generation of the postage indicium for the order.

25. The non-transitory computer-readable medium of claim 24 storing instructions that, when executed by the processor, cause the processor to further perform operations to:
    check a certainty of the predicted one or more shipping attribute values;
    present, on an user interface, the predicted one or more shipping attribute values when the certainty of the predicted one or more shipping attribute values is equal or higher than a prediction threshold; and
    detect whether there is a changed value received for at least one of the predicated one or more shipping attribute values, wherein the changed value overrides the at least one of the predicted one or more shipping attribute values.

26. The non-transitory computer-readable medium of claim 25 storing instructions that, when executed by the processor, cause the processor to further perform operations to:
    update the set of one or more prediction rules when the certainty of the predicted one or more shipping attribute values is below the prediction threshold.

27. The non-transitory computer-readable medium of claim 25 storing instructions that, when executed by the processor, cause the processor to further perform operations to:
    construct a second set of one or more prediction rules configured to predict shipping attributes for shipping one or more orders based on the set of historical data;
    receive a second order comprising known values for a second set of order attributes of the second order;
    select the set of one or more prediction rules or the second set of one or more prediction rules as a selected set of prediction rules for predicting shipping attributes of the second order based on a set of criteria; and
    execute the selected set of one or more prediction rules against the known values of the second set of order attributes of the second order to predict shipping attribute values for shipping the second order.

28. The non-transitory computer-readable medium of claim 27, wherein different criterion of the set of criteria, when selected, are configured to predict a different set of one or more shipping attributes for a same order.

29. The non-transitory computer-readable medium of claim 24, wherein the generation of the postage indicium for the order occurs independent of whether access to the postage account is locked in connection with a determination of whether the balance of the postage account is sufficient for generation of a second postage indicium for a second order.

30. The non-transitory computer-readable medium of claim 24, further comprising, after the postage indicium for the order is generated, locking the postage account balance and determining whether the postage account balance exceeds a threshold postage account balance, wherein operations to add value to the postage account balance are initiated when the postage account balance does not exceed the threshold postage account balance, and wherein the postage account is unlocked when the postage account balance exceeds a threshold postage account balance or when the value is added to the postage account balance.

* * * * *